US008510195B2

(12) United States Patent
Goslinga et al.

(10) Patent No.: US 8,510,195 B2
(45) Date of Patent: Aug. 13, 2013

(54) SYSTEM AND METHOD FOR PROVIDING A SITE-RELATED WEATHER INSURANCE CONTRACT

(75) Inventors: Roselinde Goslinga, Basel (CH); Fritz Brugger, Mollis (CH); Eric Seuret, Freienbach (CH)

(73) Assignee: Syngenta Foundation for Sustainable Agriculture, Basel (CH)

( * ) Notice: Subject to any disclaimer, the term of this patent is extended or adjusted under 35 U.S.C. 154(b) by 0 days.

(21) Appl. No.: 13/576,372

(22) PCT Filed: Feb. 1, 2010

(86) PCT No.: PCT/EP2010/000584
§ 371 (c)(1),
(2), (4) Date: Sep. 6, 2012

(87) PCT Pub. No.: WO2011/091818
PCT Pub. Date: Aug. 4, 2011

(65) Prior Publication Data
US 2012/0330690 A1   Dec. 27, 2012

(51) Int. Cl.
*G06Q 40/00*   (2006.01)
(52) U.S. Cl.
USPC ................................................. 705/35; 705/4

(58) Field of Classification Search
USPC .................................................. 705/4, 35–40
See application file for complete search history.

(56) References Cited

U.S. PATENT DOCUMENTS

2005/0119962 A1* 6/2005 Bowen et al. ................... 705/37
2006/0080214 A1* 4/2006 Hausman et al. ............... 705/37
2008/0015906 A1* 1/2008 Fox .................................. 705/4

* cited by examiner

*Primary Examiner* — Thu Thao Havan
(74) *Attorney, Agent, or Firm* — Stoel Rives LLP

(57) ABSTRACT

The invention relates to a system for providing a site-related weather insurance contract for a product, such as an agricultural product like seeds or fertilizer. The system comprises a central data processing unit (CDPU), a remote measurement device (RMD) for the measurement of site-dependent weather parameters, and a remote data processing unit (RDPU) of a retailer. The RMD measures and provides the site-dependent weather parameters as remotely measured data. The RMD communicates the remotely measured data to a CDPU. The RDPU generates a data set (RDPU data) an insurance ID code and communicates the RDPU data to a CDPU. The CDPU receives the RDPU data and generates an individual contract confirmation code and communicates it to at least one remote communication device (UCD). The invention further relates to a method and a retailer remote communication device (RRCD), computer software, and a data storage medium, each usable with the system.

23 Claims, 19 Drawing Sheets

Fig. 3

| Item ID | Product Description | Insurance type | RR Price/Kg KES | Insurance Contribution/Kg KES |
|---|---|---|---|---|
| Seeds | | | | |
| 101 | DUMA Seeds | Drought | 180 | 9 |
| 102 | ABC Seeds | Drought | 170 | 8.5 |
| 151 | DUMA Seeds | Excess Rain | 180 | 10 |
| 152 | ABC Seeds | Excess Rain | 170 | 9 |
| Crop Protection | | | | |
| 201 | CP1 | Drought | 1000/L | 50 |
| 202 | CP2 | Drought | 1200/L | 60 |
| 251 | CP1 | Excess Rain | 1000/L | 55 |
| 252 | CP2 | Excess Rain | 1200/L | 65 |
| Fertilizer | | | | |
| 301 | XYZ | Drought | 100 | 5 |
| 351 | XYZ | Excess Rain | 100 | 5 |

Fig. 11

| Drought Insurance Card | |
|---|---|
| Value Insured: | 1000 KES |
| Crop: | Maize |
| Total Discount: | 50 KES |
| Policy Number: | 09 154 217 |
| Cost: | 100 KES |

| Excess Rain Insurance Card | |
|---|---|
| Value Insured: | 5000 KES |
| Crop: | Wheat |
| Total Discount: | 250 KES |
| Policy Number: | 09 254 162 |
| Cost: | 500 KES |

Fig. 12a

| Region | Region Code |
|---|---|
| Narok | 01 |
| Narok Mau/molo | 02 |
| Makueni | 03 |
| Siaya | 04 |
| Murang'a | 05 |
| Embu | 06 |
| Eldoret | 07 |
| Kitale | 08 |
| Nakuru | 09 |

Fig. 12b

| Region | Crop | Risk | Season |
|---|---|---|---|
| Narok | Wheat/barley/Maize | Drought | March |
| Narok Mau/molo | Wheat/Barley | Drought | May |
| Makueni | Maize | Drought | October |
| Siaya | Maize/Sunflower | Drought | October |
| Murang'a | Maize | Drought | March |
| Embu | Sunflower/maize | Drought | 2 seasons |
| Eldoret | Maize | Excess Rain | March |
| Kitale | Maize | Excess Rain | March |
| Nakuru | Maize | Drought | Maize |

Fig. 17

| Item ID | Description | RR Price/Kg KES | Discount/Kg KES |
|---|---|---|---|
| Seeds | | | |
| 141 | DUMA Seeds | 180 | 9 |
| 142 | ABC Seeds | 170 | 8.5 |
| Crop Protection | | | |
| 201 | CP1 | 1000/L | 50 |
| 202 | CP2 | 1200/L | 60 |
| Fertilizer | | | |
| 371 | XYZ | 100 | 5 |

SYSTEM AND METHOD FOR PROVIDING A
SITE-RELATED WEATHER INSURANCE
CONTRACT

CROSS-REFERENCE TO RELATED APPLICATIONS

This application is a national stage application under 35 U.S.C. §371 of International Application No. PCT/EP2010/000584, titled SYSTEM AND METHOD FOR PROVIDING A SITE-RELATED WEATHER INSURANCE CONTRACT, filed Feb. 1, 2010, which is hereby incorporated by reference in its entirety.

The present invention relates to a system and a method for providing a site-related weather insurance contract. Where applicable, the invention also relates to a business method for providing a site-related weather insurance contract for insuring individual products.

In farming, investments in products like seeds, fertilizer or crop protection products can be lost due to random extreme cultivation conditions, particularly weather situations like drought, excess rain, heat, frost, flood, or pests or diseases, which were found out to be often related to specific weather situations, or earthquakes. For farmers, an insurance of agricultural products is desired to limit the risk of losing an investment. For the vendor selling such an insurance, the criteria for evaluating the occurrence of an event insured must be reliably known and measured, in particular independently of the farmer. Traditional agricultural insurance is based on individual yields and field inspections to assess losses. Inspections of individual farms for evaluating the occurrence of an event insured must be conducted reliably and objectively. In particular in developing countries, the costs involved by the traditional approach of assessing losses can be particularly high, due to small farm sizes and the condition of the communication and transport infrastructure. Another problem involved in evaluating the losses is that farmers will always have more information on their actual yields and their farm practices than the insurer. Manipulation of the relevant information, which is provided to the insurer to evaluate the losses, is a serious risk. Farm data and farm output could be influenced and insurance could be availed of when a claim for payoff is more likely. To afford such a system, higher premium rated for coverage have to be charged, therefore, and the field inspectors have to be trained and controlled to keep the system running. Therefore, the administration of such a system can be very expensive and such an insurance is therefore available only for large farmers with e.g. more than 150 acres.

Alternative approaches known for agricultural insurance utilize a specially designed measure or index which is related to the risk being hedged against, i.e. the local weather. Local weather indices are ideally highly correlated to local yields. Such a weather insurance is based on the occurrence of a weather event rather than actual losses such as crop failure. Compensations are initiated by pre-specified patterns of an index, not by actual losses. This dependence on factors beyond the influence of farmers enhances the reliability and objectivity of the system. It also eliminates the need for field inspections, which reduces costs.

However, said known systems for agricultural insurance are usually based on the insurance of loans and are distributed through banks. Therefore, the technical effort to participate in such a system is often too large. For example, banks are usually located in industrial centers, far away from the farmer's location, which makes the business processes between the bank and the farmer expensive. Also, a relatively large administrational effort is required and the individual farmer has to be able in economical and intellectual respect to participate in such a system. However, most farmers do not have the possibility to access such a system based on loans or bank accounts. As a result, for small and medium sized farmers, in particular in developing countries, generally no affordable agricultural insurance is possible so far. It was reported, for example, that in the year 2007 a fraction of 92% of the population of Kenya never used an insurance product, wherein as the main reason it was stated by these people that they could not afford it.

Therefore, a solution is required that reduces the technical effort for providing an insurance for individual products to be sold to individual users while still being affordable and offer meaningful protection on a larger scale.

The problem is solved by providing a system according to claim 1, a method according to claim 10, a retailer remote communication device (RRCD) according to claim 15, a computer software according to claim 19, a data storage medium (e.g. an insurance card) according to claim 21 and a packaging according to claim 22. Preferred embodiments of the present invention are subject matter of the subclaims.

The system according to the present invention for providing a site-related weather insurance contract for a product to be sold to at least one individual user, in particular of an agricultural product like seeds or fertilizer, comprises at least one central data processing unit (CDPU), preferably at least one remote measurement device (RMD) for the measurement of site-dependent weather parameters, at least one remote data processing unit (RDPU) of a retailer, the at least one RMD being adapted to measure and provide the site-dependent weather parameters as remotely measured data, each RMD having an individual RMD identification (ID) code assigned to it, each RMD being adapted to communicate the remotely measured data to a CDPU, each RDPU being adapted to generate a data set (RDPU data) comprising at least product data (possibly including an insurance ID code), an RMD ID code and a user ID code, the RDPU being further adapted to communicate the RDPU data to a CDPU, the CDPU being adapted to receive the RDPU data and to generate thereof an individual contract confirmation code, the CDPU being further adapted to communicate said individual contract confirmation code to at least one remote communication device (UCD) of an individual user. Examples of agricultural products include, but are not limited to, seeds, insecticides, herbicides, fungicides, plant health products, rooted cuttings or fertilizer.

The system according to the invention utilizes a unique combination of specially adapted devices, in particular the RDPUs, the CDPUs, and preferably the RMDs. By this system, the information which is necessary to be exchanged for entering into a contract between the vendor and the purchaser of an individual agricultural input in combination with an individual product insurance can, for the first time, be transferred between the involved parties in a reliable and affordable manner. This way, individual insurance of individual products for individual users becomes available for small- and medium-sized farmers for the first time, which is of particular significance for the micro-economy and prosperity of developing countries, in particular.

The meaning of the devices of the system and their preferred embodiments are explained in the following.

Retailers, equipped with an individual remote data processing unit (RDPU), are distributed over a country, and work as stockists and contact persons for the individual users, in particular farmers, who are the customers for buying a product bundle consisting of an agricultural product and a financial service, i.e. the weather insurance.

Preferably, the system provides at least one retailer remote communication device (RRCD), which preferably is said RDPU or which preferably contains or is connected to said RDPU. The RRCD can be an electronic device, which is capable of processing digital data, of importing and exporting data, and in particular capable of communicating with external devices, and which is operable by an individual retailer. The RRCD preferably is a portable device, i.e. preferably with a mass lower than respectively preferred 10 kg, 5 kg, 2 kg 0.5 kg or 0.3 kg, is preferably a managed communication device, i.e. a commercial communication device whose communication capability is limited to the communication with a CDPU of the system, e.g. is a managed mobile phone device, which preferably uses an established standard telecommunication network like GSM or UMTS for communication.

The RRCD preferably comprises import means, which can comprise a camera, a bar code scanner (for one-dimensional (1D) barcodes, two-dimensional (2D) QR codes or different codes), an radio frequency identification (RFID) chip reader and/or writer, a keyboard, a fingerprint-reader or the like for importing a product data, an ID code, an insurance-type ID code, an RMD ID code and/or a user ID code. Preferably, such import means allow for a simple operability of the RRCD in the system, which reduces the probability of errors occuring during the operation of the RRCD by a retailer. This way, the system works more reliably.

Preferably, the RRCD utilizes a 2D scanner to import data to be processed by the RDPU. A 2D scanner can be adapted to scan so-called "Quick Response codes" (QR codes), which comprise a square matrix containing black and white pixels, which represent a binary code. The code contains a specific information and provides redundancy such that reading errors can be compensated to a certain amount, which makes the system more reliable. A scanner, in particular a 1D or 2D scanner, can be a camera, a digital camera or other means which is capable of reading a visually represented code and decode it to receive the information contained in the code. Said code preferably is a system code or represents a system code, wherein a system code preferably is unique for the system according to the invention, generally.

Preferably, the RRCD and/or the RDPU is adapted to decode a system code, which can be an item code or can contain an item code. A system code shows information which is relevant for the system according to the invention. Such system relevant information can be the product data, which contains information on the product to be sold to an individual user.

The product data can comprise information on the physical product to be sold to a user, e.g. an agricultural "input" product like, for example, the type of crop, crop protection or fertilizer. In particular, the product data can contain a product ID code, which is selected to unambiguously identify a certain type of a product or agricultural product, the product ID code preferably being a product name, a letter combination, a digit, a number/digit combination or another code.

Moreover, the product data preferably contains an insurance ID code, which identifies the kind of weather insurance which is related to a certain product. Possible kinds of weather insurances are, for example, insurances against drought, excess rain, pests and disease, frost, flood, storms, hail, earthquakes or other events which can be relevant for the value of a purchased agricultural product or which can be harmful for the quality of the product or its application. Therefore, the product data can represent information on both the agricultural product and the financial service (insurance) if sold in combination as a bundle of product and service. Therefore, the term product can also refer to the combination of a physical product and a service, in particular to the combination of an agricultural product and the financial service (insurance), in the present description of the invention. However, the insurance ID code can also be separate from the product ID code or the insurance type and can be provided as separate insurance code or another data combination which contains the insurance ID code and additional data.

Moreover, the product data preferably contain information on the amount of the physical product sold to a user, preferably expressed in the mass of the product, e.g. expressed in kg, or the volume of the product, e.g. expressed in litres or $dm^3$. However, the information on the amount of the physical product can also be separate from the product ID code or the product data and can be provided as separate information on the amount of the physical product or another data combination which contains the information on the amount of the physical product and additional data.

The product data preferably is coded as a single visually represented code, preferably a QR code. This offers the advantage that reading and decoding the product data can be performed easily, in an error-tolerant way and fast, which makes the system more efficient. Preferably, a QR code is read by the digital camera of an RRCD of a retailer. For said purpose, it is preferred that a QR code list is provided to the system which shows the correlation of the product data, which is related to the code, in particular the name of the agricultural product, e.g. "Crop type 1", and/or the amount of the product, e.g. "2 kg", and/or the type of insurance, e.g. against "Excess rain". Furthermore, the list can contain the prices which are associated to a product.

Preferably, the RRCD and/or the RDPU is a portable electronic device and preferably is configured to perform computer program controlled functions, said functions being for example importing of data by means of an import device. Preferably, the RRCD and/or the RDPU comprises, or is (regionally or locally) linked to devices which comprise, respectively preferred,

- a programmable data processing unit, e.g. a microprocessor,
- data storage means, e.g. RAM, ROM, flash memory, solid state disks or hard disks and the like,
- data input/output means, for example connections for wired communication, e.g. an Ethernet (LAN) connection, connections for narrow-range wireless communication, e.g. WLAN or Bluetooth, and/or connections for wide-range wireless communication, e.g. GSM, GPRS or UMTS,
- user interface means, e.g. a display, a speaker, a microphone, or a keyboard,
- import devices, e.g. an optical scanner, e.g. a digital camera or a fingerprint reader, which is particularly useful for providing more security or for registering users, who might be illiterate,
- positioning means, e.g. a GPS or Galileo device, for determining the geographical position of the RRCD or RDPU, which can be useful for implementing control and security functions,
- and/or other devices.

Preferably, the RRCD of a retailer is adapted to generate a data set (RDPU data) comprising at least the product data, preferably an RMD ID code and preferably a user ID code, the RDPU being adapted to communicate the RDPU data to a CDPU. A user ID code can be a mobile phone number if the user possesses a mobile phone, which in this case preferably is used as a remote communication device (UCD) of the user to confirm the contract to the user, preferably to also pay potential compensation via a payment system based on mobile communication and to deliver other information to the user. Moreover, a user ID code can be any code which identifies a user within the system.

The RDPU data can further comprise a retailer identification code (retailer ID code), which identifies the retailer. This is useful for assigning purchases and contracts to an individual retailer, which allows to set up a central database located preferably in or in connection with a CDPU. This way, provisions for successfully confirmed contracts can be assigned, booked and paid to a retailer. Moreover, a retailer can be identified who is assigned to a specific contract for which the system indicates that a compensation is due. The retailer preferably redistributes a certain percentage of the compensation or preferably the full compensation in the form of a physical agricultural product, e.g. seeds, instead of money. However, the retailer can also distribute the compensation to the user in the form of money. Usually the compensation in the form of money is initiated or paid out by the insurance company. However, cashless compensation payoff is preferred (see below).

Preferably, the RDPU data can provide additional information on the purchaser (user), information on the geographical position of the transmitting RRCD or RDPU (e.g. GPS data or Galileo data), or other data.

The RDPU is adapted to communicate the RDPU data to a CDPU.

Being adapted for communication, preferably means in the context of the present invention that a device, e.g. the RRCD, RDPU, CDPU, RMD or UCD provides means, which allow the communication (sending and/or receiving) of digital data or signals with another device or individual which is in particular part of the system. Such communication means can comprise input/output interfaces, e.g. connections for wired communication, or, e.g. antennas for a wireless communication. A communication between devices can be installed for permanent data or signal exchange or for intermediate data or signal exchange, for example for exchanging (sending and/or receiving) data upon a request of a first individual or device, e.g. the CDPU. Communications means preferably are adapted for utilizing a commercial telecommunication network, for example a GSM network, UMTS network, using GRPS, SMS, USSD, the Internet, via WAN, LAN, WLAN, VPN, or other wired or wireless remote data networks. Preferably, a device of the system, in particular an RMD and/or an RDPU, is adapted to automatically and/or semi-automatically and/or initiated manually communicate data, in particular the measured parameters or the RDPU data, respectively, in particular upon request of the CDPU. Preferably, the system is adapted or optimized to require only a reduced data traffic, i.e. reduced transferred data volume and a reduced amount of numbers of establishments of communications, e.g. phone calls, for fulfil its tasks, in particular, for confirming contracts. This saves money and makes the insurance product even more affordable for smallholder farmers.

Preferably, the RRCD and/or the RDPU is configured to perform computer program controlled functions, said functions being for example to control the subdevices which are contained in or connected to the RRCD (or RDPU), for example the function of importing data by means of an import device. This preferably means that the RRCD or RDPU contains programmable data processing means, as for example a microprocessor or a programmable ROM, e.g. EEPROM. The RRCD preferably is a (commercial) communication device, as for example a personal computer (PC, notebook, netbook, PDA, tabloid PC or the like), a mobile phone, which preferably is a managed mobile phone, a commercial (managed) mobile phone, a (commercial) smart phone, iPhone®, or the like. The communication device preferably is basically operated by a (commercial) operating system, which preferably is Symbian OS, but can be another OS like, for example, Mac OS X, iPhone OS, Android, Maemo, Palm OS, WebOS or Windows Mobile. Additional software means, like for example a Java Platform, can be provided to run the computer software according to the invention.

The invention in particular relates to a computer software (or application), e.g. a computer program code, which can be executed to control functions related to the system according to the invention. The computer software preferably is a Java application. Respective preferred features, individually or in combination, of the computer software or the application comprise:
    functions for importing data by means of an import device,
    a user interface for allowing a user (retailer) to scan codes and to transfer data to the server (e.g. a CDPU),
    the ability to scan a system code by a single action, e.g. a single push of a button,
    the ability to send data over one or more preferred telecommunication networks (see above),
    a store and forward capability to store the data locally in the case that no network for transferring storable data to another device is available, and/or
    the ability to self-update over the air (via a wireless connection), in particular such that the application automatically connects to a server (e.g. a CDPU), and, if it detects that a newer version is available, receives a newer version from the server and updates itself automatically.

The application provides the possibility to be configured, preferably via a configuration menu, to respectively preferably, alone or in combination:
    let the operator (retailer) view and change the retailer ID,
    let the operator view and change each of the details recorded during the stockist registration,
    let the operator select the desired interface language,
    let the operator enable or disable a speech control, which is another preferred feature/function of the RRCD/RDPU, or configure other parameters which are related to a function of the RRCD/RDPU.

The computer software is preferably adapted to be run on an RRCD or RDPU of the system according to the invention. The RRCD or the RDPU is preferably adapted to be functionally limited to the functions which are provided by the computer software according to the invention, such that preferably in the case of a commercial mobile phone, only the application according to the invention can be executed, preventing the possibilities of performing conventional telephone calls, sending conventional SMS and making use of other conventional mobile services. However, such a programmed lock is possible, but not obligatory, and preferably is adjustable, and can be preferably activated or deactivated, preferably remotely, e.g. by a CDPU or an administrator by using password protection means or other security means.

Preferably, a single central data processing unit (CDPU) is provided to the system. However, more than one CDPU can be provided, which allows to make the system more secure (in terms of backup and/or redundancy) or flexible to use and to administrate. In particular, it is preferred that the system provides at least one, and preferably, at least two CDPUs or two CDPUs. Preferably, the CDPU is adapted to receive the remotely measured data from a specific RMD and to evaluate the data. Preferably, the CDPU is permanently or at least intermittently connected to at least one RDPU and/or RMD. Preferably, the CDPU is adapted to send information to a user, in particular to a remote communication device (UCD). Preferably, the CDPU is adapted to push an information to reach a UCD, i.e. to transmit information, in particular a contract confirmation code, which can also comprise details on the insurance type, the insurance period, the product insured and the insurance contract ID code, or other information, e.g. product information like advertisements, without the need of being actively (i.e. by a user interaction) admitted by the UCD, or also with delivery confirmation, or to send an SMS or the like to a UCD.

Preferably, an UCD is a mobile communication device, in particular a commercial mobile phone, communicating via an established telecommunication network. This offers the relevant advantage that even users in weakly developed areas with a generally weak infrastructure, e.g. in developing countries, can be reached, where a telecommunication network is often present, but other services or administrational institutions (banks, insurance agencies etc.) are rarely available. This way, the product insurance according to the invention can be made accessible even for small users, i.e. farmers, who otherwise and never before were able to enter into such insurance contracts. In most regions of the world, the availability of mobile phones is increasing over the time. In Kenya, for example, the number of people possessing a mobile phone increased from 0.1 mill. In 2007 to 7.3 mill. in 2009, to be compared with the total population of 35-40 mill. Preferably, the system comprises at least one UCD.

Preferably, a UCD is a non-commercial mobile phone which is adapted to substantially communicate only or mainly within the system according to the invention, and is not configured to communicate within a commercial telecommunication network. This allows to promote the distribution of the product insurances and the selling of bundled products even to users who do not already possess a UCD. Such a non-commercial UCD is preferably low-cost, e.g. obtainable for a base price of 20 $ US or less. A non-commercial UCD (e.g. a mobile phone) is preferably adapted to be configured to become usable within an established telecommunication network in order to allow normal phone calls via said—previously non-commercial and now commercial—device. This allows to also distribute telephone contracts to be sold in a bundle with an agricultural product and with an insurance.

Further, a CDPU is preferably adapted, e.g. by software means, e.g. an appropriate Application Programming Interface (API), respectively preferred, to communicate with a money transfer service based based on mobile communication, in particular a money transfer service based on mobile phones (MMTS), as for example the M-Pesa service, which is widely used in Kenya, for instance, to initiate money transfers, e.g. from the obligor of the compensation to the receiver of the compensation, to receive money transfers or information on confirmed money transfers, e.g. from users paying the premiums or from insurance companies, to initiate bulk payouts, e.g. based on a spreadsheet or list, to multiple users, and/or to receive a detailed log of all payments send and received by the MMTS.

However, money transfer due to compensation payments is preferably controlled by an insurance company, preferably upon indication of an event insured by a supplier company, i.e. by a CDPU, for example.

Said MMTS API of the CDPU is preferably provided with security means, e.g. encrypted data exchange means, to provide security in order to ensure integrity of service and data confidentiality, e.g. SSL for a World Wide Web (WWW) interface. Further, the MMTS API is preferably capable of receiving real-time payment confirmations.

Preferably, a CDPU is adapted to send data and to receive data delivery confirmations, in particular to send SMS and to receive SMS delivery confirmations, in particular SMS long code that works across all network operators. Preferably, a CDPU is adapted to provide an Application Programming Interface (API) for sending/receiving SMS via Internet protocols. Preferably, a CDPU comprises security means for securing the insurance database against undesired external data manipulation and data theft, in particular comprising an adequate firewall and security measures to ensure integrity of service and protection of message data.

Preferably, the CDPU comprises a data storage or is connected to a data storage which contains an insurance database. The insurance database contains information on the insurances or insurance contracts which have to be confirmed (open contracts) or which have been confirmed (closed contracts). Said information can be correlated data which correlate product data, in particular one or more product ID codes (connected or not connected to one or more insurance ID codes), with other data, e.g.

a user ID code, possibly one or more insurance ID codes, information on the purchased amount of agricultural products, a payment status, other user information data, the retailer ID code of the retailer (or RRCD or RDPU) who sold the product related to the contract, one or more insurance policy ID codes, which identifies an individual contract.

Preferably, the insurance database has the form of a Relational Database and is controlled by a Relational Database Management System.

Preferably, a CDPU is adapted to receive the remotely measured data from a specific RMD and to evaluate these data. Said CDPU can be the CDPU, which administrates the insurance database (with contract data, user data and product data, for example), or can be another CDPU, preferably dedicated for processing measured data. Preferably, the RMD and/or the CDPU is adapted to evaluate the measured data from a specific RMD for assessing whether they prove an event insured having occurred at the site of the specific RMD and to generate and provide the result as event data which preferably also comprise the corresponding RMD ID code of the RMD. Preferably, a CDPU is adapted to analyze the measured data for finding weather situations, represented e.g. by specific weather data patterns, which refer to events insured, like pests, diseases or the like. For example, the existence of certain fungus spores can be correlated to a specific weather situation, e.g. periods of certain humidity and certain temperatures.

Preferably, a CDPU comprises data storage means or is connected or connectable to data storage means which provide assessment auxiliary data, which assist in evaluating whether the remote measured data from a specific RMD prove an event insured having occurred at the site of the specific RMD. Assessment auxiliary data can comprise historical data containing values for weather parameters which were detected in the past in said site or region of the specific RMD. Furthermore, the assessment auxiliary data can contain data which were calculated using such historical data, e.g. norm data, such that preferably a comparison of these data to (average) remotely measured data from the specific RMD allows to assess whether the remotely measured data are abnormal and indicate a weather event insured, e.g. a drought, excess rain, frost, or other extreme events impacting the cultivation of crops like earthquakes, pest, diseases or the like.

Preferably, a CDPU indicates, depending on the event data, that a compensation is due for at least one specific product and at least one specific user. Preferably, a CDPU is adapted to communicate said event data in particular to another CDPU or a RDPU, which preferably indicates, depending on the event data, that a compensation is due for at least one specific product and at least one specific user. Preferably, a CDPU is adapted to automatically initiate, with or without additional confirmation of the obligor or the obligors of the respective compensation or compensations, a compensation payoff or a bulk compensation payoff for multiple users affected by the relevant weather event, upon the result of said assessment. Preferably, the CDPU is adapted to automatically initiate payoffs via MMTS upon the result of said assessment, with or without additional confirmation of the obligor or the obligors of the respective compensation or compensations.

The system preferably comprises at least one remote measurement device (RMD) for the measurement of site-dependent (in particular weather) parameters, the at least one RMD being adapted to measure and provide the site-dependent (in particular weather) parameters as remotely measured data, each RMD having an individual RMD identification (ID) code assigned to it, each RMD being adapted to communicate the remotely measured data to a CDPU. Preferably, the system comprises multiple RMDs, which are distributed to different geographical sites, each RMD preferably being arranged in a stationary or at least intermittently stationary way. Preferably, an RMD is a portably device, in particular of less than 40 kg, 25 kg, 10 kg or 5 kg, which provides mounting means to mount the RMD stationary, e.g. to trees or buildings, and preferably provides a mast to place the sensor(s) in a height above the mounting position of the RMD.

An RMD can be a custom-designed weather measurement device which provides measured data substantially only within the system according to the invention. The RMD preferably comprises means for measuring one or more physical parameters of the environment which are relevant for assessing a weather event by appropriate sensors. Such sensors for such parameters can be temperature sensors, sensors for the relative humidity, rain sensors, wind sensors, capacity or impedance sensors for measuring the capacity or impedance of samples of environmental air, optical sensors, e.g. optical precipitation sensors, seismographic sensors or other sensors. Preferably, an RMD comprises two or more sensors of the same time, to generate redundancy of the measurement results, which improves the reliability of the measurements. Preferably, an RMD conducts small measurements, e.g. of less than 10, 5 or 1 dm$^3$ of environmental air, to allow for a flexible positioning and/or cheap fabrication cost of the RMD. Preferably, an RMD provides a biosensor, e.g. for detecting biological compounds in an air sample of the environment. Such biological compounds can be biological aerosols, fungi spores, pollen, bacteria, insects. The detection of certain biological compounds can be used to detect an event insured, like pests, diseases and the like. A biosensor can comprise a microfluidic device for the analysis of small gas or liquid volumes in the range of microliters or nanoliters. A biosensor can comprise a gas-phase chromatograph or mass spectrometer with or without evaluation electronics, for example.

The weather parameters, which are measured by the RMD, are understood to be parameters, which are meaningful for the evaluation of an event insured, in particular excess rain, heat, frost, flood, earthquakes, or pests or, diseases, which were found out to be often related to specific weather situations but which preferably also can be measured directly.

Preferably, an RMD provides at least one a support or a case for the sensor(s), which is adapted to allow the measurement of said parameters, e.g. by providing holes or membranes with pores in the case, the holes and pores being dimensioned to allow the measurement of, for instance, environmental air, but preventing any undesired opening of the case to remain undetected, or by providing a transparent wall, which allows to optically measure the environment of the RMD. Preferably, an RMD is configured in a tamper-proof way to ensure the integrity, security and reliability of the measured data. This way, manipulation can be avoided, which makes the system more reliable.

Preferably, an RMD is configured to operate autonomous. This can be achieved by providing the RMD with a generator for electricity, which preferably is a photovoltaic element (solar cell). Moreover, an RMD preferably is provided with a rechargeable battery, e.g. a Lithium-Ion secondary battery or other accumulator. Moreover, a battery management system can be provided, which is adapted to start measurements only, if the battery contains sufficient electric energy. Preferably, the RMD comprises a timer, generating data on the local time, which are preferably used to generate the measured data of the RMD. Preferably, an RMD comprises an electronic control device, which preferably is programmable and comprises a digital data processor, for example a microcontroller. Thereby, the RMD is configured to control the sensor(s) and/or to measure data according to a predetermined program, which preferably can be changed by remote communication, for example being updated via a remote connection, for example by a communication device of a technician or automatically, by a CDPU, for instance. Preferably, the RMD comprises a data storage, e.g. flash memory or the like, to store measured data or other data locally, which is useful in particular in a case where data cannot be communicated immediately via a wireless data connection, if for example a telecommunication network is temporarily unavailable.

Preferably, an RMD is adapted with remote communication means, which can comprise a wireless data interface. For example, the remote communication means preferably comprise a SIM card and communication electronics adapted to use a GSM or UMTS telecommunication network, by SMS, GPRS or USSD to exchange data with a CDPU, which can be the CDPU, by which the insurance database is administrated, or can be a different CDPU.

Preferably, an RMD is configured to automatically and repeatedly, in particular periodically, communicate the measured data to another device, which preferably is a CDPU, at predetermined times or according to predetermined periods. For example, an RMD can be adjusted to communicate the measured data repeatedly after a period, which lies respectively preferred in a range of 1 to 5 seconds (s), 5 to 10 s, 10 to 60 s, 1 minute (min) to 5 min, 5 min to 10 min, particularly preferred 10 min to 20 min, 20 min to 60 min, or different. This offers the advantage that the system and the method according to the invention can be used to automatically pay a compensation to a user, if an event insured is detected by the system. Moreover, an improved reliability of the measured data is gained by the repeated measurements, and an improved database with weather data of a specific site is generated, which helps to further improve the system.

Moreover, an RMD can be a weather satellite or an established weather station which is possessed by a third party, e.g. a private or public company or a governmental institution.

An RMD and the embodiments of the same, a according to the description of the present invention, are also considered to be an invention, alone and/or in the context of the system according to the invention.

The measured data are used to evaluate an event, which has to be insured. Such an event preferably can be indicated by any characteristic parameter for any environmental event, which differs significantly from an expected value for a region or site. Expected values can be determined by analyzing historical weather data of the region. Such weather events may refer to excess rain, flood, drought, frost, storm, earthquakes, diseases or other.

Preferably, a large number (at least 10, 50, 100, 500, 1000 or 10000) of RMDs is assigned to the system. Preferably, more than one RMD is assigned to a product to be sold or to be insured. This adds redundancy to the system and makes it more reliable. In particular, a number larger than one (larger than 2, e.g. 3, 4, 5, 6, 7, 8, 9, 10 or more) or a random number of RMDs is assigned to a product to be sold or to be insured, or is assigned to a user. This improves the reliability and security of the measured data even more.

Furthermore, the invention relates to a data storage medium (e.g. an insurance registration card) for storing and preferably visually indicating data which are acquired by the system according to the invention, the method according to the invention, or the retailer RRCD according to the invention. The data storage medium can be used optionally with other subjects according to the invention, in particular with embodiments of the business method. Preferably, the data storage medium is a specific insurance registration card which stores information like the kind of weather event insured (drought, excess rain or the like), the value insured together with its currency (e.g. 100 $ US), the crop that is covered by the insurance (e.g. wheat or maize), a total discount granted for products which are bought by the bearer of the insurance card, the insurance policy identification number, which is unique to each card, and/or the price of the specific insurance card.

Preferably, an insurance card does not contain electronically readable data, but preferably only information being, for instance, printed or manually written on it, in which case the insurance card can be a simple cardboard or plastic card. This adds robustness, resilience against data loss and simplicity to the system and reduces the cost for the operator, as the insurance card might be produced and distributed in large numbers to retailers to be further distributed to potential insurance customers.

However, an insurance card can also be an electronically readable storage medium which contains a storage unit for the above-mentioned data, a display unit for displaying all or some of the data stored in it, and/or a selection means, e.g. one or more keys, for selecting the data to be displayed on the display.

Furthermore, the invention relates to a packaging for a product to be insured by the system according to the invention or the method according to the invention, wherein data storage means are provided, wherein preferably said product data and/or an insurance ID code and/or said RMD ID code and/or said user ID code are stored. The packaging preferably comprises means for indicating information, which preferably permanently indicate said information, in particular upon external triggering, in particular visually, said information being for example the vendor's company sign or name,
the insurance company's sign or name,
the product name,
the user name or ID,
the name of the first remote site (RMD)
or the like.

Further, the invention relates to a method for providing a site-related (in particular weather) insurance contract for a product to be sold to individual users, in particular of an agricultural product like seeds or fertilizer, using in particular the system according to the invention, the method comprising the steps:

providing at least one remote measurement device (RMD) for measuring the site-dependent (weather) parameters at a first remote site, each RMD having an individual RMD identification (ID) code assigned to it, each RMD being adapted to communicate the measured parameters to a CDPU, registering a user at a second remote site (retailer) by generating a user ID code, selecting an RMD and a respective RMD ID code in dependence on a third remote site, where the user will apply the product (product application site), selecting a product to be sold and to be insured, preferably selecting an insurance type, which has a corresponding insurance ID code, generating a data set (RDPU data) comprising at least the product data and preferably comprising said insurance ID code, the RMD ID code and the user ID code, communicating the RDPU data to a central data processing unit (CDPU) by means of a remote data processing unit (RDPU), having the CDPU generate an individual contract confirmation code from the RDPU data, preferably in dependence on a payment status for an individual user, having the CDPU communicate said individual contract confirmation code to a remote communication device (UCD) of the user.

Preferably, the method comprises the step of measuring the site-dependent (weather) parameters by means of at least one RMD, each RMD having an individual RMD identification (ID) code assigned to it, and each RMD being adapted to communicate the measured parameters to a CDPU.

Preferably, the method comprises the step of evaluating the remotely measured data from a specific RMD and assessing whether they prove an event insured for the remote site of the specific RMD, and, if so, providing the result by means of the CPDU as event data including the information that a compensation is due for those contracts related to the specific RMD an preferably also comprising the corresponding RMD ID code.

Preferably, the method comprises the step of communicating said event data to an RDPU, which indicates, depending on the event data, that a compensation is due for a specific product insured and a specific user.

Preferably, the method comprises the steps of comparing the RMD ID code of a specific RMD for which a compensation is due to multiple, in particular to all, RDPU data representing a confirmed and active contract; determining, depending on the result of said comparison, for which user or users a compensation is due; and, if the number of such determined users is not zero, paying a compensation to the determined user or users.

Moreover, patent protection is requested for a business method, if applicable, and the embodiments of the business method. The business method according to the invention aims to support smallholder farmer's in dealing with weather risks by developing and piloting agricultural micro-insurance products. This is the first time that farmers with as little as 1 acre of land, for example, can access insurance. The business method preferably utilizes the system according to the invention and/or the method according to the invention.

The business method preferably involves several parties: the farmer (or user), who wants to purchase an insured product, in particular by closing a product specific (i.e. "micro-") insurance contract, the stockist, who preferably locally hands out the product (being insured or not) to the farmer, and who collects data, e.g. data related to the farmer, the weather station (e.g. the RMD) assigned to the farmer, the specific product and preferably the insurance type, which the farmer wants to purchase. The stockist further transmits the data (e.g. the RDPU data) to a server and preferably collects the insurance premium from the farmer. The stockist preferably also performs the transfer of the collected premiums to an insurance company, which is another party involved in the business method. Preferably, a supplier company is provided as a party of the business method, for supplying the (agricultural) product to be purchased by the farmer and to be insured by the insurance company, and preferably to pay a contribution to the premiums, e.g. 50%, for the premium of the product insurance, which is received by the insurance company, or to pay no contribution to the premiums, preferably to provide the compensation in form of the product, e.g. seeds, if a model is used where payout is provided in the form of the physical product. Moreover, in the case that a compensation is due, the supplier company can optionally provide a part, e.g. 50% of the compensation in the form of the physical product, e.g. seeds, while another part, e.g. 50%, of the premium is paid by the insurance company. Further, a mobile payment system can be involved, e.g. M-Pesa, preferably used as a service, which is supplied by a mobile payment company.

The business method comprises the steps:
registering a user (e.g. the farmer), preferably by a retailer, who is located at a second remote site, by generating a user ID code,
selecting an RMD, located at a first remote site, and a respective RMD ID code in dependence on a third remote site, where the user will apply the product (product application site), wherein the first, second and/or third remote site can be identical or different,
selecting a (e.g. agricultural) product to be sold and to be insured,
preferably selecting an insurance type, which has a corresponding insurance ID code, wherein the type of insurance preferably depends on a specific event to be insured against (e.g. excess rain, drought or the like),
generating a data set (RDPU data) comprising at least the product data and preferably comprising said insurance ID code, the RMD ID code and the user ID code,
communicating the RDPU data to a server, for example to a CDPU, in particular by means of a communication device, for example the RRCD or RDPU, respectively,
preferably calculating the contribution to the premium, which is to by paid by the farmer and/or the product supplier company,
let the user pay the contribution to the premium, which can be the full premium,
evaluating, if the premium was paid by the user (e.g. detecting the payment status),
generate an individual contract confirmation code from the RDPU data, preferably in dependence on the payment status for an individual user, for example by means of a CDPU,
communicating said individual contract confirmation code, thereby preferably closing the insurance contract, to a remote communication device (UCD) of the user, wherein the contract confirmation code can also comprise information on the insurance type, the insurance period, the product insured, the user ID code, or other information.

The first, second and third remote site can be partly or completely the same, or can be partly or completely different.

Preferably, the business method utilizes the system and the method according to the invention for providing a site-related (in particular weather) insurance contract, in particular closing a (in particular weather) insurance contract, for a product to be sold to at least one individual user, in particular an agricultural product like seeds or fertilizer. The business method provides reduced effort to perform insurance purchases, because it is easy to perform, paperless, fast and requires comparably low administrational costs. This is in particular achieved by using mobile phones as the RRCD and the UCD, for example. In contrast to many other infrastructure, even developing countries are increasingly widely covered by established telecommunication networks for mobile phones, and the availability of mobile phones increased fast in the last years. The advantage is further preferably achieved by using Quick Response (QR) codes to code the product data, whereby data processing can be performed fast and reliably. This enables to insure amounts as small as the value of one kg of seeds, without transaction costs becoming higher than collected premiums, which has not been possible with convenient insurances based mainly on paper. The business method, the system and the method according to the invention preferably provide real time information on the purchase process making it possible to see exactly what products are being purchased and insured at each participating stockist. This information is highly valuable to the supply chain and sales & marketing departments of the participating supplier company (or multiple companies). Furthermore the solution can be used to send out tailored messages, e.g. via SMS, to insured farmers, which can be used for agricultural advisor services or marketing. The business method further allows a large number of farmers (users) to participate and the business method further benefits from involving a large number of farmers, who purchase a large number of (in particular micro-) insured products, instead of insuring an inflexible, single, large investment by a single insurance, accompanied by a single large premium, as it is the case for some known insurances, where the event insured is not the weather but the real crop loss.

During the course of the season the RMDs are preferably monitored centrally, e.g. by a CPDU, which can be the CDPU, which stores an insurance database or can be another CDPU, which is linked to or belongs to the system of the invention, and in the event that compensations are due, the insurance company preferably transfers the payout directly to the farmers UCD, e.g. his mobile phone, by using the mobile payment system.

Preferably, alternative purchase options for purchasing a purchased product are provided. Most preferred, during a so called "pay as you go" purchase, a user pays a small premium on top of a a purchase of seeds, fertilizer or crop protection products or the like in order to have that single item covered by insurance. An alternative option employs a data storage medium, for example an insurance card, in particular the data storage medium according to the invention, wherein a farmer purchases said insurance card at the beginning of a season in order to have all of his/her investments covered by insurance.

A further possible alternative or additional feature of the invention, in particular as an alternative of buying an insurance card or the like, could be to have the insurance be included as part of a bank loan. In this scenario the bank on behalf of the farmer pays the premium as part of the loan. The bank registers the farmers that have taken out a loan and pays the corresponding premiums to the insurance company. If there is a compensation payout the money goes directly to the bank deducted from the original loan. This is part of the terms and conditions and is accepted by the farmer when taking out a loan that includes weather insurance. The insurance helps to secure the loan for the farmer as it reduces the banks risk. In contrast of the traditional methods of insuring loans, the farmer preferably is flexible to decide whether and when and preferably how he wants to insure an individual product, which he buys at a retailer. However, availability of bank loans and banks may be limited in certain countries and therefore, the embodiment is less preferred than the PAYGO or insurance card approach.

Preferably, the insurance card and bank related business methods, in particular, provides discounts, wherein discounts on participating products are offered at a fixed amount per kilo/liter. This is in useful to make insurance affordable to farmers. Using a chart, a farmer can see how much discount he will receive per kilo of seeds regardless of the store price for those seeds. If the retailer (i.e. the stockist) charges the discount price to the farmer then the supplier company preferably needs to reimburse the stockist plus preferably compensate for the transmission costs, e.g. the SMS costs that have been accumulated. Reimbursement could be performed in cash (via M-Pesa or bank transfer) or via future inventory purchases.

The business method further preferably provides that in the case of an event insured, e.g. a drought, farmers are compensated directly, e.g. via M-Pesa payouts, at the end of the season. The only exception to this is the farmers who received the insurance as part of a bank loan. In this case the compensation payout goes back to the bank instead of to the farmer. Even though the insurance contract is with the farmer the terms and conditions stipulate that the bank is entitled to the compensation payout whenever a bank initiates the insurance policy payment.

The business methods preferably also provides that the system of the invention is not only used for tracking insurance registrations or discount payments, but that it can also be used as a marketing platform by sending messages to registered farmers, in particular via SMS.

Definitions of terms and features of the system according to the invention and the other subjects of the invention can be used to understand the method, the business method and other subjects according to the invention and vice versa. Moreover, features of the system can be adapted to form respective features for the method or the RRCD according to the invention or the business method and vice versa.

Moreover, further advantages, features and applications of the present invention can be derived from the following embodiments of the system, the method according to the present invention and the business method according to the invention with reference to the drawings. In order to understand the technical system and the method according to the invention and their scope, embodiments of the business method are explained in the following, which use embodiments of the system and the method. In the following, equal reference signs substantially describe equal devices, if not described differently.

FIG. 3 shows a table with preferred configuration of the product data in form of so called item IDs.

Figure 8:
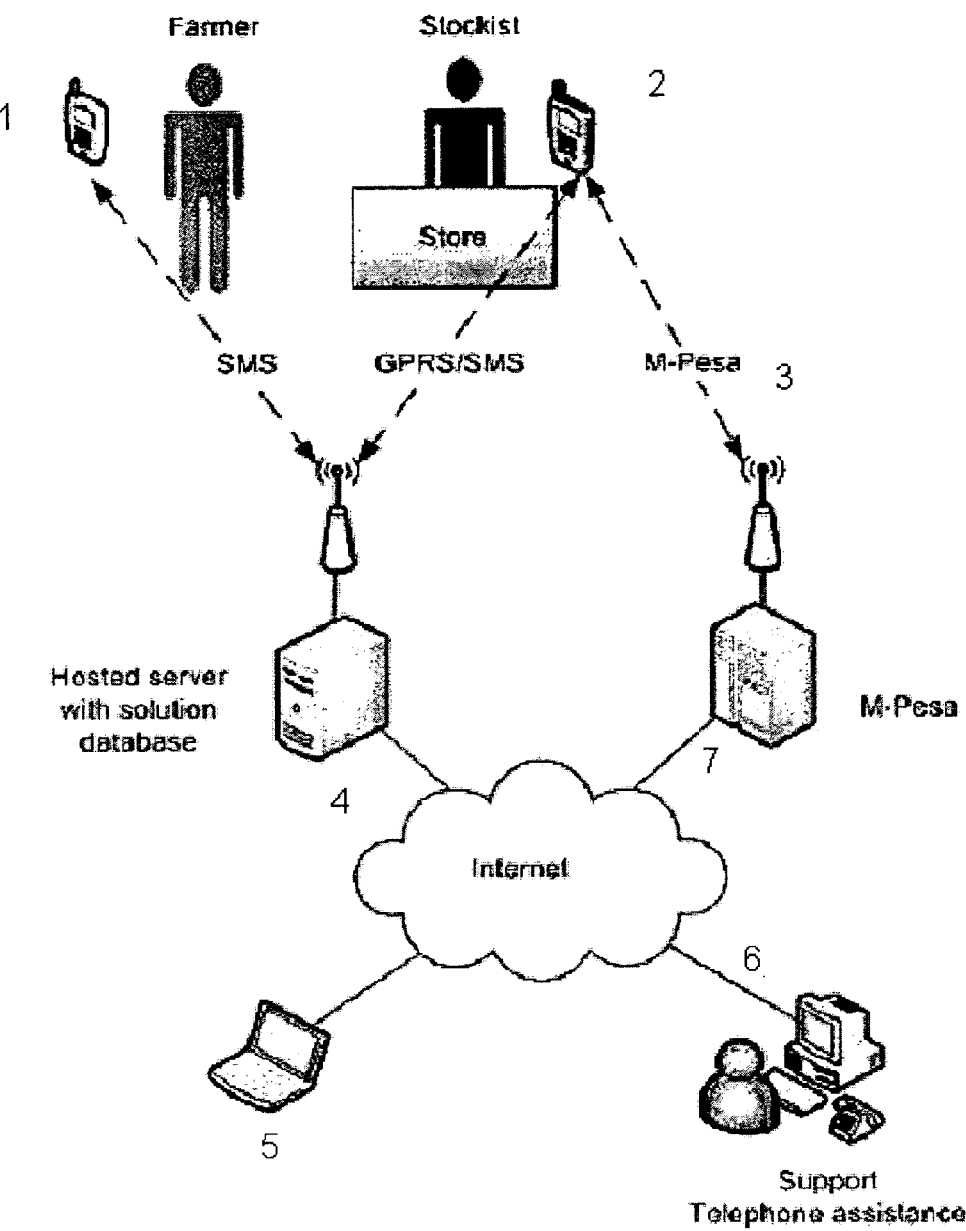

FIG. 8 also shows a scheme of the PAYGO model of a preferred embodiment of the method and a preferred embodiment of the business method according to the invention.

Figure 9:
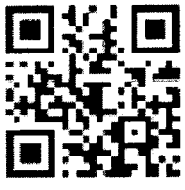

FIG. 9 shows an example of product data which are coded and presented as a QR code list of a preferred embodiment of the method and a preferred embodiment of the business method according to the invention.

Figure 10:
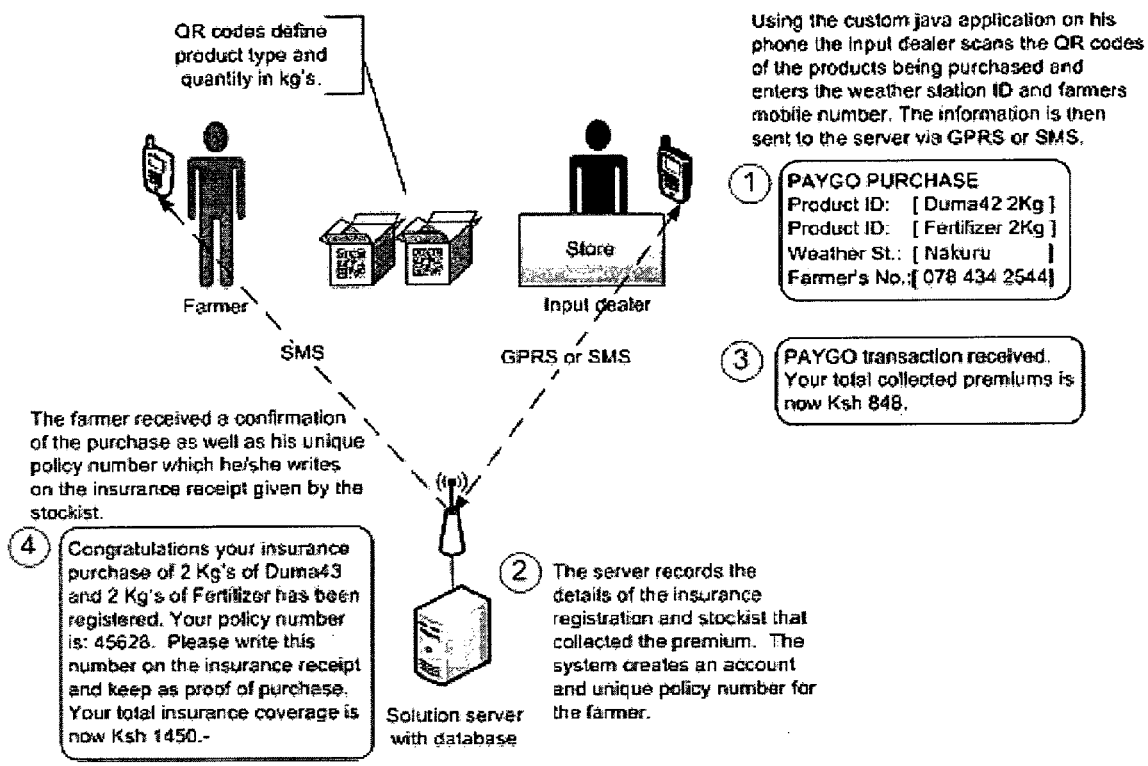

FIG. 10 shows a preferred method of PAYGO purchase of a preferred embodiment of the method and a preferred embodiment of the business method according to the invention.

FIG. 11 shows two examples of an insurance card, which can be used as data storage media according to the present invention.

FIG. 12 shows a list of RMD ID codes (Region Codes), which uniquely identifies each RMD in each country.

Figure 13:
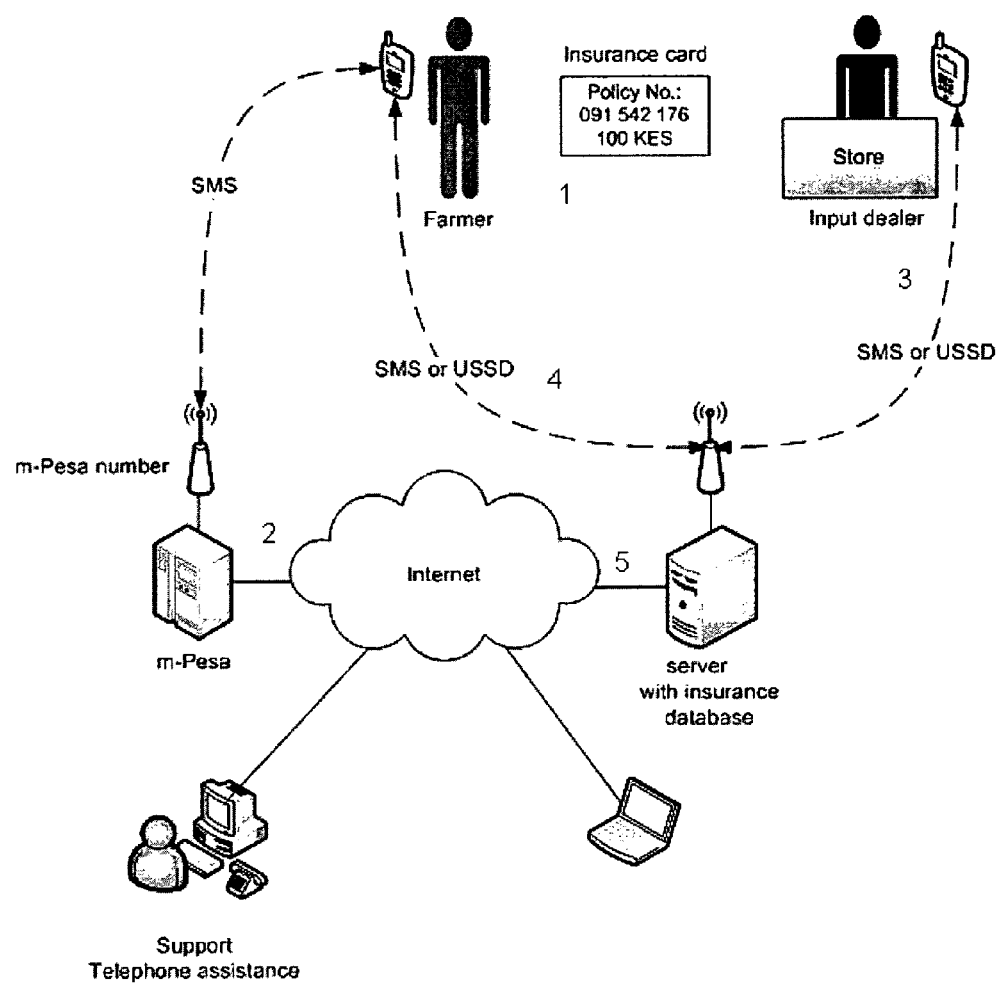

FIG. 13 shows a diagram with the relationship between the entities involved in an insurance card purchase, of a preferred embodiment of the method and a preferred embodiment of the business method according to the invention.

Figure 14:
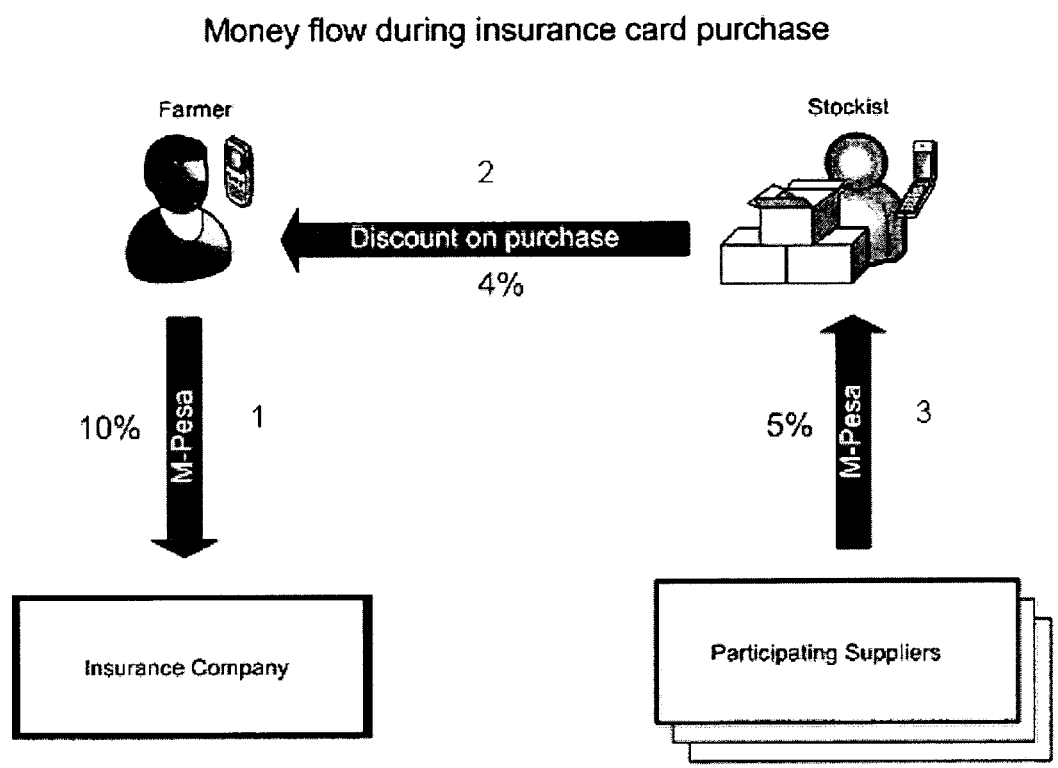

FIG. 14 shows a diagram with the money flow during the insuring card purchase shown in FIG. 13.

Figure 15:
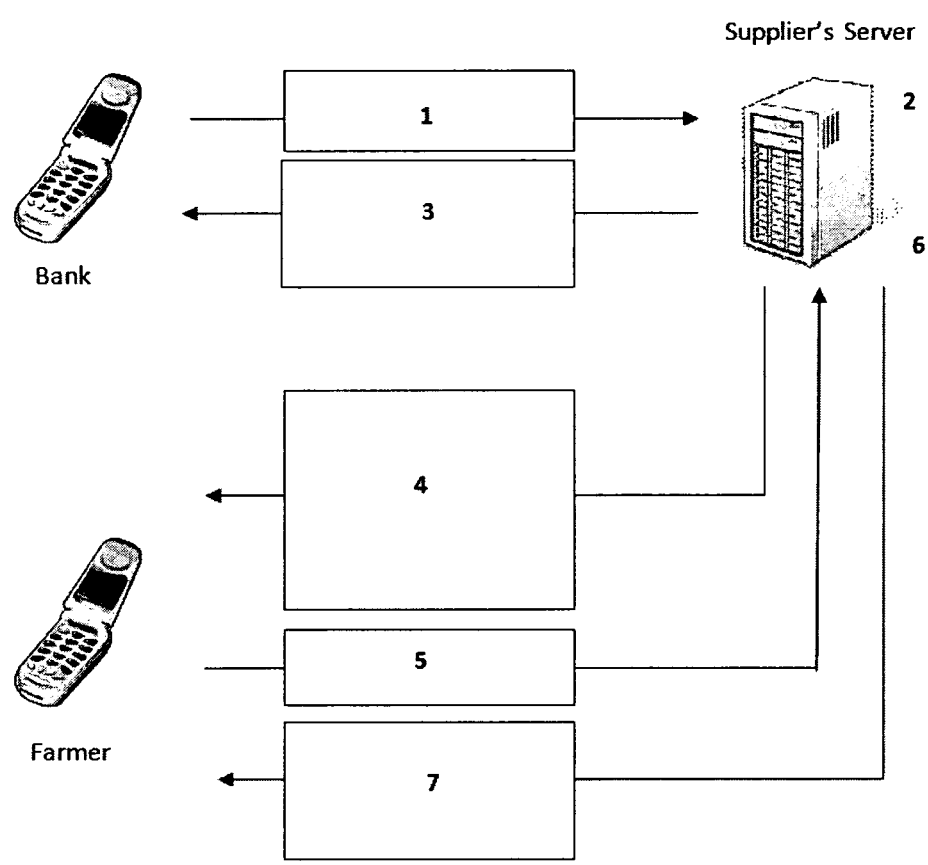

FIG. 15 shows a diagram with an insurance purchase using bank loans, which is another preferred embodiment of the method and a preferred embodiment of the business method according to the invention.

Figure 16:
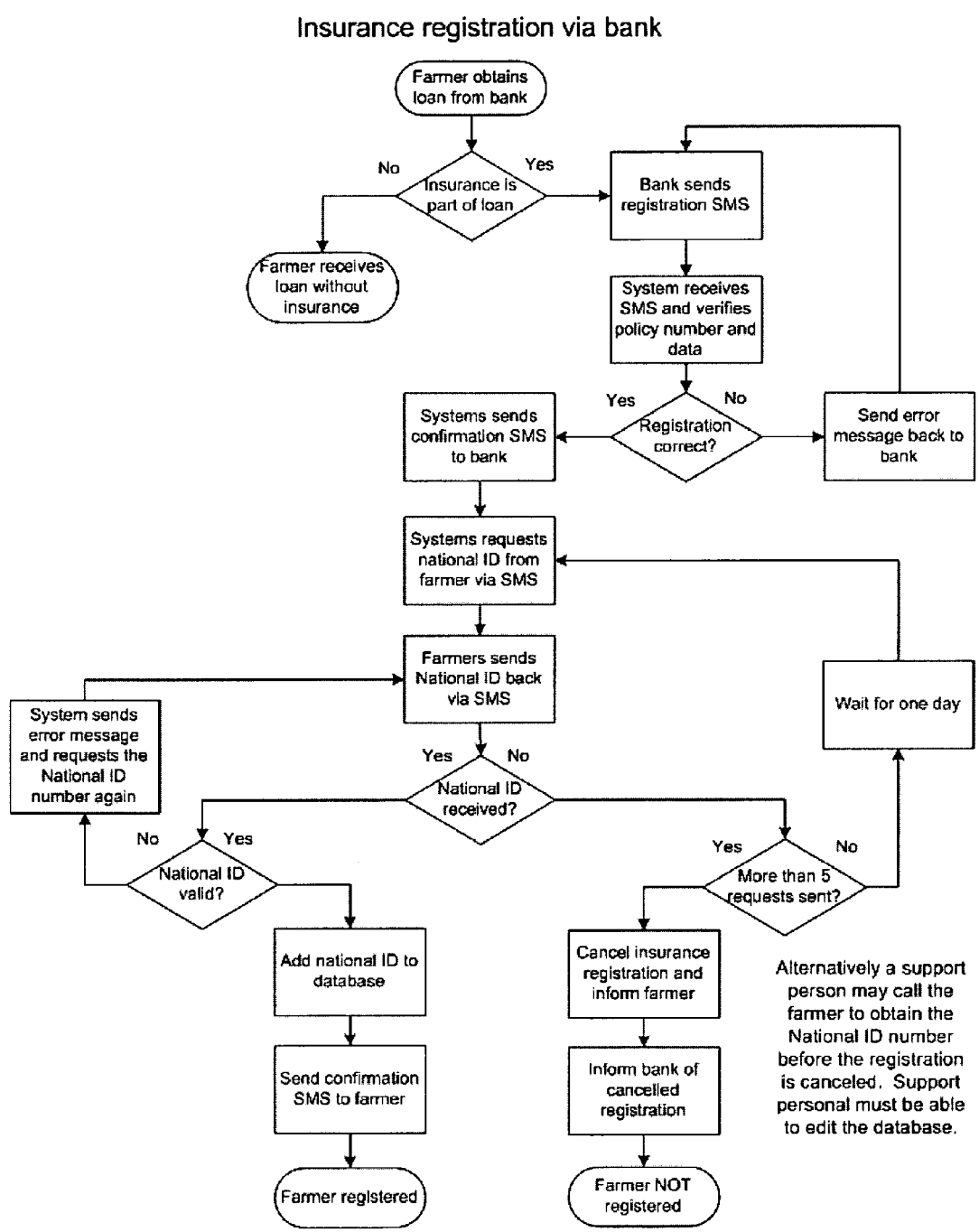

FIG. 16 shows the diagram of the workflow, which is used during the bank loan purchase shown in FIG. 15.

FIG. 17 shows a chart, which is available to the farmer in a case where discounts on the purchase price are used, which is another preferred embodiment of the method and a preferred embodiment of the business method according to the invention.

Figure 18:
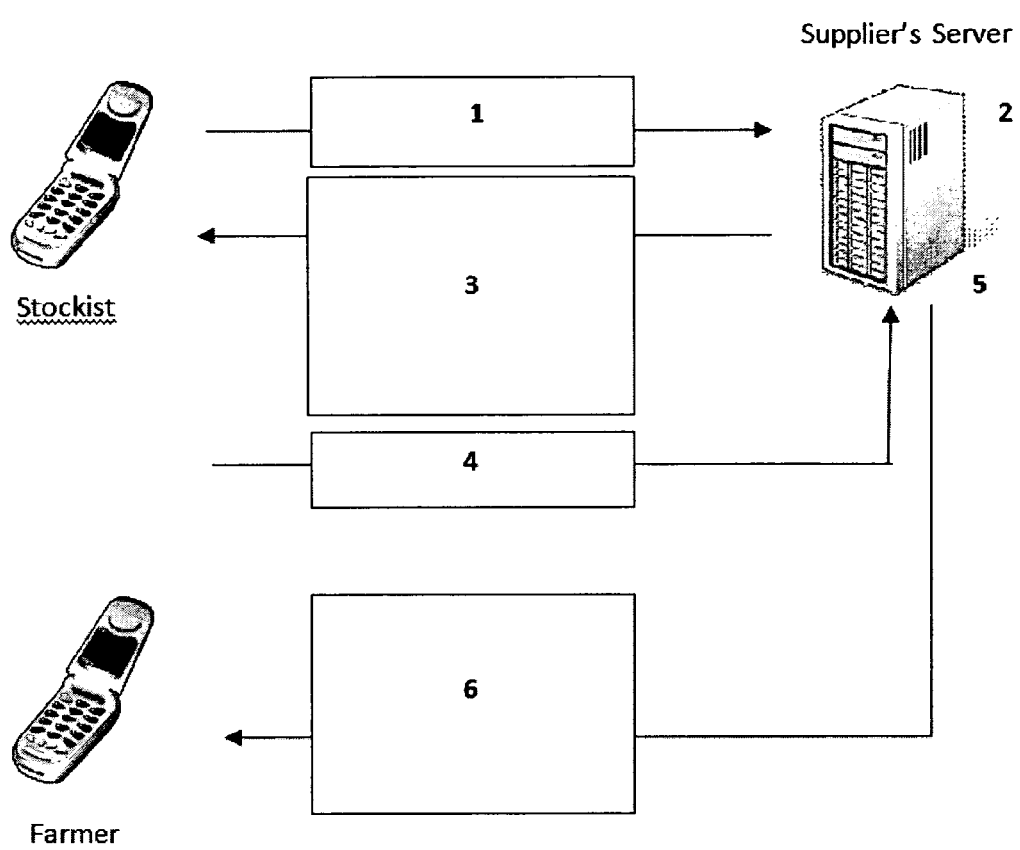

FIG. 18 shows a diagram of the purchase process using discounts, related to the embodiment of FIG. 17.

Figure 19:
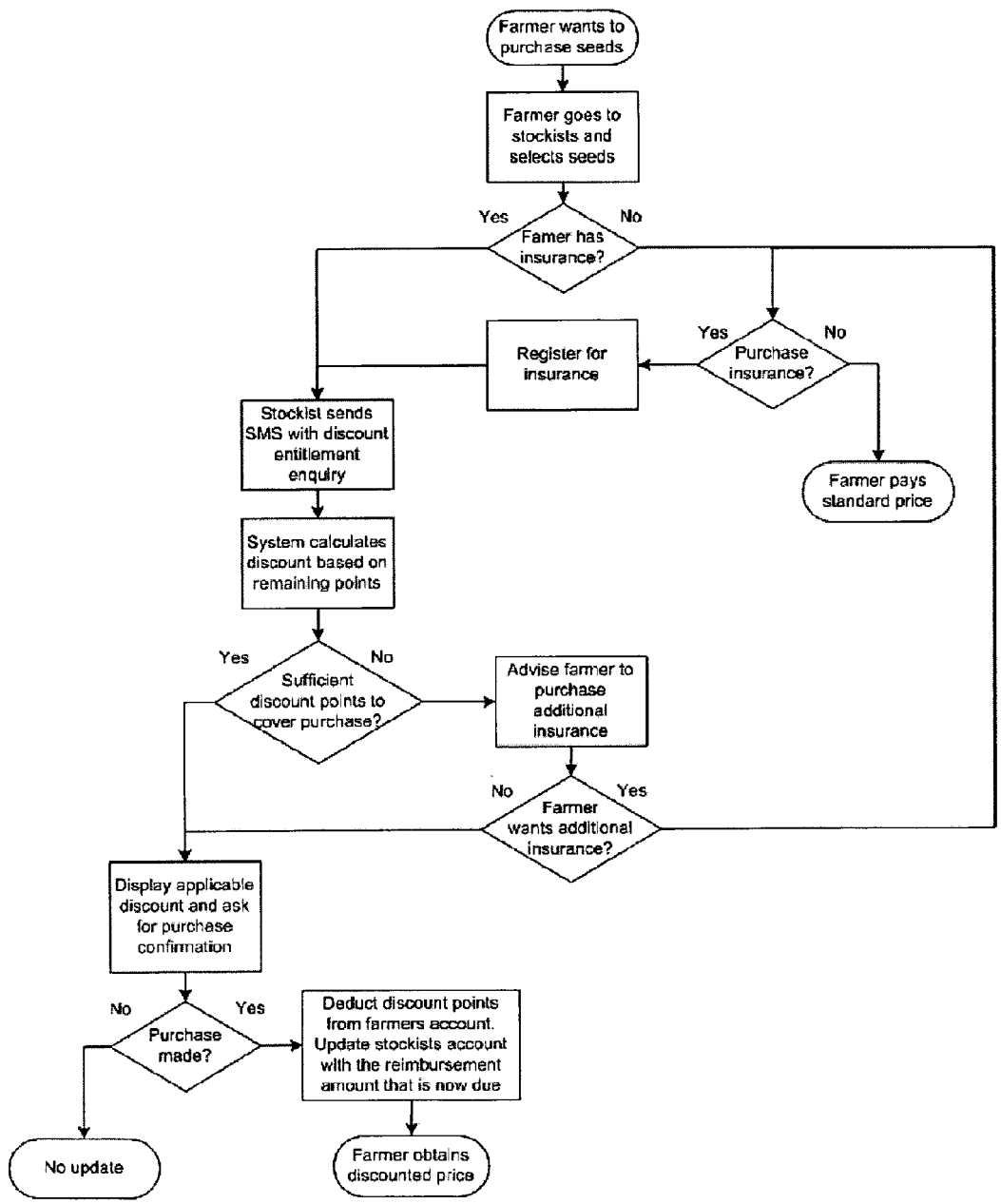

FIG. 19 shows a diagram of the product purchase with discount workflow, related to the embodiment of FIGS. 17 and 18.

Figure 1:
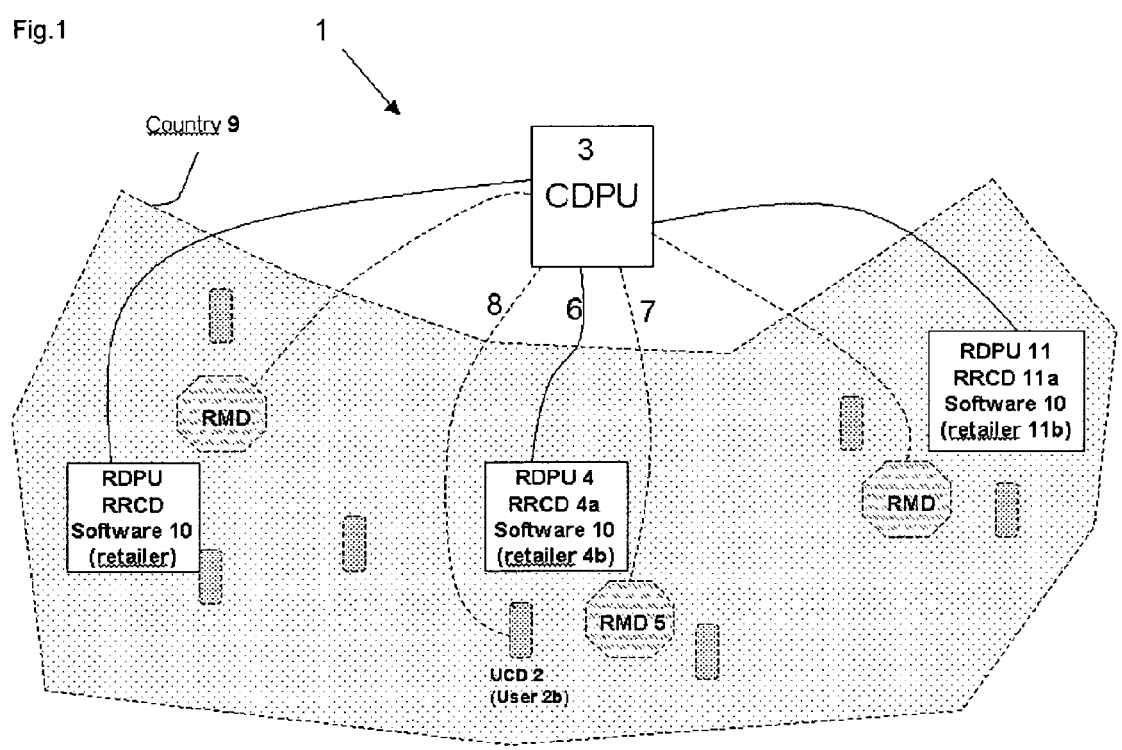
FIG. 1 shows a scheme explaining an embodiment of the system according to the invention, showing in particular the devices of the system and their interactions.

FIG. 1 shows a scheme explaining an embodiment 1 of the system according to the invention, showing in particular the devices of the system and their interactions. The devices and their connections can be used by the method according to the invention and to apply the business method, which preferably also is part of the invention, as far as applicable. Devices shown with solid lines are contained in the system 1, components with dashed lines are not contained in the system 1. In the following, the system, the RRCD and the method according to the invention are explained by illustrating the purpose of the system, which is the realization of an economic strategy aiming at generating profit by selling products and insurances to users. The system 1 is provided to supply smallholder farmers, in particular a "User 2b", in the country 9, e.g. Kenya, with a site-related weather insurance contract for a product to be sold to at least one individual user, in particular of an agricultural product like seeds or fertilizer.

The "User 2b" possesses a commercial mobile phone ("UCD 2"), which is connected to a commercial telecommunication network which is established in the country 9 and provides sufficient coverage to let "User 2b" receive phone calls and SMS at the site of his farming land, where he is planning to grow the crop. User 2b desires to secure his investment of buying seeds by entering an insurance. In order to demonstrate the capability of the invention, the user 2b here is considered to be illiterate and to have never been able to study written information, in particular information on potential traditional crop insurances, wherein it should be noted that this is not typical for Kenya, because the measured illiteracy rate in Kenya was as low as 30% according to the German Office of Foreign Affairs.

The crop is sold by the company which possesses the exemplary system 1 according to the invention, in particular the central data processing unit (CDPU) 3. Preferably the term CDPU refers to a single server. Here, the CDPU 3 represents at least two central computer servers, which are connected to exchange data, one first server dedicated to receive and process the measured data from the RMDs, one server dedicated to communicate between the other entities of the system, in particular between the RDPUs and the UCDs, which are involved. The insurance database and other database can also be administered by the second server, or by a different server. The system 1 is further adapted to communicate with several remote measurement devices (RMD) via a GSM telecommunication network for the measurement and communication of site-dependent weather parameters, in particular with RMD 5. The system 1 further contains several remote data processing units (RDPU) of retailers, in particular the RDPU 4, which is contained in a remote retailer communication device (RRCD) 4a, which is a managed mobile phone which can only be used to exchange data with the CDPU 3. The RMDs are adapted to measure and provide the site-dependent weather parameters as remotely measured data, each RMD having an individual RMD identification (ID) code assigned to it and each RMD being adapted to communicate the remotely measured data to a CDPU, here via a secured Internet connection 7. An RMD is a regional weather sensor station which delivers reliable information on the region where the Retailer 4b and the User 2b are located.

It should be noted that User 2b may also buy products with the desired insurance at another retailer who is not close to his site, e.g. Retailer 11b, as long as Retailer 11b registers User 2b with the system using the correct RMD ID code which identifies RMD 5 as the RMD assigned to the site of User 2b where User 2b is planning to seed the crop on his farming land.

The RDPU 4 is adapted to generate a data set (RDPU data) comprising at least the product data, possibly including an insurance ID code, an RMD ID code and a user ID code, the RDPU 4 being adapted to communicate the RDPU data to a CDPU 3, the CDPU 3 being adapted to receive the RDPU data via SMS connection 6 and to generate thereof an individual contract confirmation code, the CDPU 3 being further adapted to communicate said individual contract confirmation code to the remote communication device (UCD 2) of User 2b via SMS connection 8.

Further features of the system 1 can be derived from the following description of the embodiment of the method according to the invention, which utilizes the system 1, and the business method according to the invention, which utilizes the system 1 and the method according to the invention:

In order to buy a product with insurance, User 2b needs a retailer (stockist) who sells the desired product. Retailer 4b is one of several stockists who participate in selling products with insurance. Stockist 4b will reveive a percentage of the premium of the individual insurance sold to User 2b.

For participating in the program, Retailer 4b must firstly register with the system 1. Selected stockists are trained and then registered with the system. Registration takes place via a web form. Trainers are available to register stockists on the spot by using a laptop computer with an Internet connection. The following information is required during registration:

Name of the shop
First Name of owner
Last Name of owner
National ID number
Postal address
Mobile phone number
E-mail address (if available)
Bank account
Weather stations (RMDs) linked to this shop
Distributor level ("Key distributor" or "Stockist")
If "Distributor level" is "Stockist": address of the key distributor who delivers to the stockist (since only stockists may participate who have a key distributor as a partner); possible key distributors are available in a drop-down list
Account ID
GPS coordinates.

The selected Stockist 4b who works with the system receives a managed mobile phone (RRCD 4a with RDPU 4) that contains a custom Java application (Software 10, which is an embodiment of the computer software according to the invention). The Java application will make it easy for stockists to register payments which can be done via a first payment method (PAYGO) as well as a second payment method (CARD discount payments), the second payment method using a data storage medium according to the invention (a system-specific insurance card in the present example).

The system 1 is provides stockists with a single type of RRCD (mobile phone) so that a single model of mobile phone is used by all stockists. This makes it easier to develop and manage an embodiment of the Software 10 according to the invention, which is to be run on the RRCDs, in particular on RRCD 4a. The phones will be provided with a SIM card to enable GPRS to be used. Where possible, the phones will be locked down so that they can only be used for the project and not for making other calls or using data for other purposes.

The Software 10 will only show the subset of those weather stations (RMDs) that are linked to the particular store. If a store only supports one weather station (RMD) then that station is selected by default. Otherwise the stockist must select which weather station to use for each transaction. The list of weather stations linked to a shop is dynamic and must be updated by the Software 10 from CDPU 3, which acts as a server computer, when required (according to an appropriate update protocol).

During registration, each stockist will be provided with a Stockist ID code, which is a 4 digit number that uniquely identifies the stockist. This number will be entered into the Software 10 and will be used from then on to identify the stockist for all future transactions. It is possible, however, for the stockist to change the stockist ID number stored in the Software 10 via a configuration menu.

The Software 10 is an example for the computer software according to the invention, for the control of functions, which are related to the system and the method according to the invention. The software 10 is a mobile application for a Symbian-OS-operated mobile phone which is written in the Java programming language and has the following main features:

- a clear, simple and fast user interface that allows users (stockists) to scan codes and send data to the server (CDPU)
- the ability to read QR codes quickly without complicated user interaction, i.e. for scanning three QR codes, for instance, the user must not be required to do more than pressing a single button three times
- the ability to send data using GPRS or SMS; the application will attempt to use GPRS first, but if GPRS is not available it will utilize SMS instead
- store and forward capability: if no network is available then the application stores the data locally until a network service exists again
- the ability to update itself over the air: if the application detects that a newer version is available it will update itself from the server
- preferably, a configuration menu with the following options:
  - stockist ID number: the user can view and change the stockist ID
  - stockist profile: the user can view (and change) each of the details recorded during the stockist registration
  - language: the stockist can select the desired user interface language; English is the default language
  - application Version: displays the version number of the application The software 10 (also called "client") is adapted to automatically update to a newer version. Thereby, the application version information is sent during every data transfer (see transfer protocol). The client sends its current version number and the server sends the version number of the client software available on the server. This way the client can detect whenever there is a newer version of the software or files available, and the server can log the version number of the client to help in debugging. Whenever a client detects that a newer version of the software or data files exists the client can initiated an upgrade which involves the following steps:

1) Check that a GPRS connection is available;
2) Download the newer version of the application or data file(s);
3) Verify the integrity of the download application update by examining the downloaded contents against the checksum;
4) If the new version is ok then inform that user that an update is about to be performed and then perform the update.

There are two main strategies for how insurance can be purchased within the context of the system and the method according to the invention, which are particularly relevant for the business method according to the invention:

1. "Pay as you go" (PAYGO): A farmer pays a small premium on top of a purchase of seeds, fertilizer or crop protection products in order to have that single item covered by insurance.
2. Insurance card: A farmer purchases an insurance card at the beginning of a season in order to have all of his investments covered by insurance.

The diagram in FIG. 8 shows (analogously to FIG. 1) the devices of an embodiment of the system 1' according to the invention which are in particular involved in system 1', which is adapted to perform a PAYGO insurance purchase. The farmer (User 2b) goes to a store and pays an additional amount to the stockist (in cash) to include insurance for his purchase (step 1). The stockist registers each PAYGO purchase using the Java application (software 10) on his mobile phone (RRCD 4a with RDPU 4) at the hosted server (CDPU 3), collects the premiums from the farmers (2) and confirms the payment by means of the software 10, which updates the database of the hosted server (CDPU 3) by means of a GPRS or SMS based data communication. Both the server (CDPU 3) and client application (software 10) store each sent data package locally until a confirmation has been received from the receiver. The package is only removed from the local storage when a confirmation from the receiver has been obtained. The CDPU 3 confirms the purchase to the farmer by means of SMS, thereby closing the insurance contract and sending detail information on the contract. Periodically, the stockist transfers the total premiums collected to a managed account via M-Pesa (3). The hosted server with solution data base (CDPU 3) can be accessed over the internet by different parties (4). Stockist registrations can be performed, insurance premium collections can be monitored, farmers can be notified of compensation payouts, and the like, by means of the hosted server (CDPU 3) (5). The server is accessible by a support telephone assistant and his data processing device (PC, smart phone and the like), who can be located anywhere, being connected to the CDPU 3 via the Internet (6). The M-Pesa mobile payment system registers the premium payments of the farmers at the CDPU 3 (7).

The PAYGO model aims at reducing a barrier to insurance by eliminating the need to pay for the full coverage up front. The farmer can elect to cover each input purchase made (i.e., a purchase of a product like seeds, furtilizer or crop protection) by paying a slightly higher price that insures that individual input against weather risk. On any participating product, two prices are displayed, namely one "Standard price" without insurance and one "Insured price" that includes weather insurance.

Exemplary products could be provided in a system specific packaging, according to the invention, labelled for example:

DUMA Seeds
Standard price: 180 KES
Insured price: 189 KES
The insured price includes weather insurance and protects your investment in case of a drought.

or

Fertilizer
Standard price: 1000 KES
Insured price: 1050 KES
The insured price includes weather insurance and protects your investment in case of a drought.

or

Crop protectionStandard price: 600 KES
Insured price: 630 KES
The insured price includes weather insurance and protects your investment in case of excess rain.

The supplying company subsidizes part of the insurance cost (e.g. 5% of the product price) in order to promote the product and create buy-in with the customer. The farmer pays around 5% on top of the standard price to have the product insured. In this way the total premium amount (10%) is collected and paid to the insurance company. The seeds insurance is applicable at the beginning of the season while the fertilizer and crop protection insurance options can be purchased at any time during the year, i.e. there are different cut-off dates depending on the product purchased. The insurance properties and contracts need to be defined once for each product type.

The model is suitable for farmers that do not know how much of an investment they will be able to make throughout the season. At each purchase farmers can choose if they wish to hedge their own risk by paying the insured price or not, depending on their personal circumstances.

Figure 2:
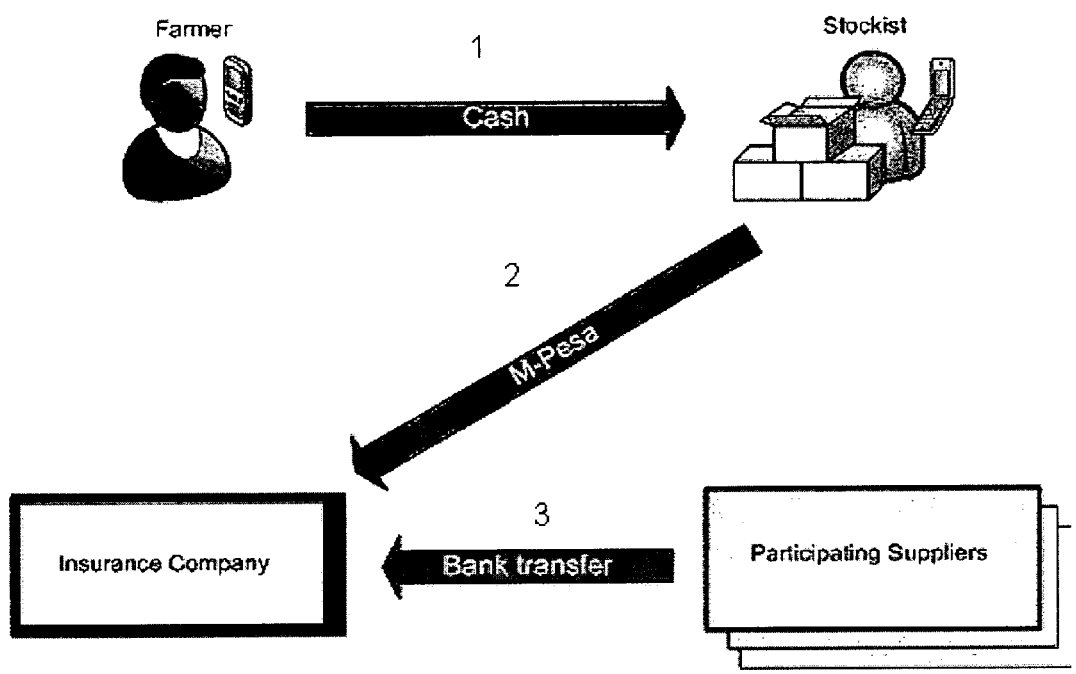
FIG. 2 shows a diagram with the flow of money for the insurance premiums with the "Pay as you go" (PAYGO) model of a preferred embodiment of the method and a preferred embodiment of the business method according to the invention.

The diagram in FIG. 2 shows the flow of money for the insurance premiums with the PAYGO model. In step 1, premium contribution is paid by the farmer in cash to the stockist when a product is purchased. The stockist accumulates premium contributions and sends total amount periodically to the insurance company (2). Each participating product supplying company (also called "supplier") transfers their respective contributions to the insurance company at the end of the registration period (3). The farmer pays 5% and the supplier pay 5% to produce the total premium of 10%.

FIG. 8 also shows a scheme of the PAYGO model. An insurance contract exists between the suppliers and the insurance provider as well as between the farmers and the insurance provider. Each party (suppliers and farmers) pays their respective share of the premium and any compensation payouts are returned to the parties in equivalent shares. A supplier, such as the operator of the system 1, pays the total premium amount in one go at the end of the insurance purchase period.

When User 2b wants to purchase his desired insured agricultural product, the following happens:

Each product has a unique product ID code (item ID) that identifies which product is being purchased. Stockist 4b enters the purchased amount, e.g. the number of kilograms or litres, of each item into the RRCD 4a, and the RRCD 4a responds, by assistance of the Software 10, with the total insurance contribution due for that purchase. Possible item IDs can be configured as shown in the table in FIG. 3.

Whenever a farmer wants to purchase an input with insurance, the stockist, after registering the user, preferably scans in a QR code by means of his RRCD-camera, said QR code containing the information on, respectively preferred, the event insured, e.g. drought, the product, e.g. Maize X, the amount of product insured, and the RRCD communicates the product data to the CDPU. Alternatively, the stockist sends the product data by another means to the CDPU, for example by an SMS with the following product data:

Stockist ID
Farmer's mobile number
Region
Item ID
Amount in kg.

A related example SMS might provide the corresponding string: "2331 0796000499 02 141 2".

Multiple purchases can be bundled into a single SMS in the following manner:

Stockist ID
Farmer's mobile number
Region
Item1 ID
Amount in kg
Item2 ID
Amount in kg
Item3 ID
Amount in kg.

In this case, a corresponding example SMS might read: "2331 0796000499 02 141 2 202 2 371 10".

Preferably, the RRCD 4a of Retailer 4b comprises a 2D scanner, e.g. a digital camera, which is capable of taking pictures of a QR code which is contained in a list of QR codes and associated products, the list being available to Stockist 4b to be scanned. The Software 10 decodes the picture with a specific QR code to gather the information contained in the same, in particular the product data of the product (including a specific insurance) that is desired for purchase by User 2b. An example of a QR code list is shown in FIG. 9.

Figure 4:
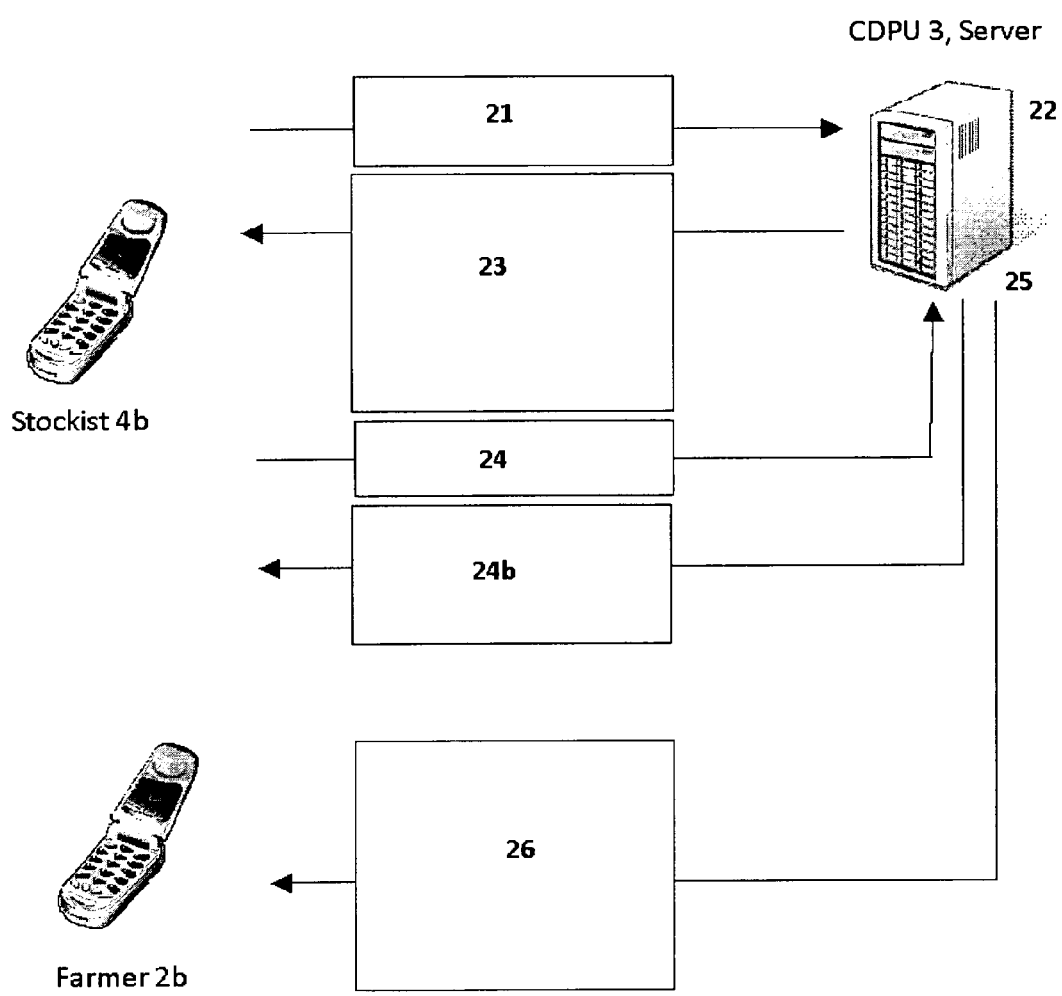
FIG. 4 shows a diagram with steps of the PAYGO purchase process of a preferred embodiment of the method and a preferred embodiment of the business method according to the invention.

The PAYGO purchase process therefore comprises the steps as shown in the diagram of FIG. 4:

The stockist sends his ID, the farmer's mobile number (the user ID code of User 2b), the product ID code, the selected RMD, and the amount in kg to the CDPU 3 (Step 21), by means of his RDPU, manually or software controlled automatically.

The CDPU 3, or more preferably the software 10 of RDPU 4 calculates the insurance contribution due (Step 22).

The CDPU 3 preferably answers to the RDPU 4, e.g. with the following message:

"The insurance contribution on 2 kg of Maize seed is 18 KES. Does the farmer wish to pay this additional amount? Reply with "Yes" if the purchase is made." (Step 23)

The RDPU 4 preferably answers "Yes" to the CDPU 3 (Step 24).

The CDPU 3 preferably sends a message to the RDPU 4, e.g.:

"The total amount of accumulated contributions is now 740 KES" (Step 24b)

The CDPU 3 records the purchase in the insurance database 25.

The CDPU sends a confirmation message to the mobile phone (UCD 2) of User 2b, e.g.:

"Your payment of 18 KES for drought insurance on 2 kg of Maize seeds has been registered. The total amount of insurance coverage you now have is 134 KES." (Step 26)

However, as the premium is preferably calculated by the RDPU and not by the CDPU, the related optional communication between CDPU and RDPU can be omitted, which advantageously leads to lower communication cost.

When a farmer makes a PAYGO purchase, he receives a paper receipt from the stockist, preferably a blank form, on which the farmers completes the following information: the insured items, the insurance contract ID code, which uniquely identifies the closed contract amongst the other contract ID codes of other contracts, which are stored in the insurance database of the CDPU 3, the insured risk and the contract end date. The receipt may further comprise a list of different SMS commands, which are available to the user, preferably with a written instruction like "For information on your insurance send an SMS with any of the following commands to 54120", herein 54120 being the phone number, which connects to the SMS data exchange interface of the CDPU 3. Possible commands can be written in the form "POLICY to list all of the policies registered to your mobile, STATUS to find out about the current status of the weather insurance, PAYOUT to find out if you have any active compensation entitlements".

Figure 5:
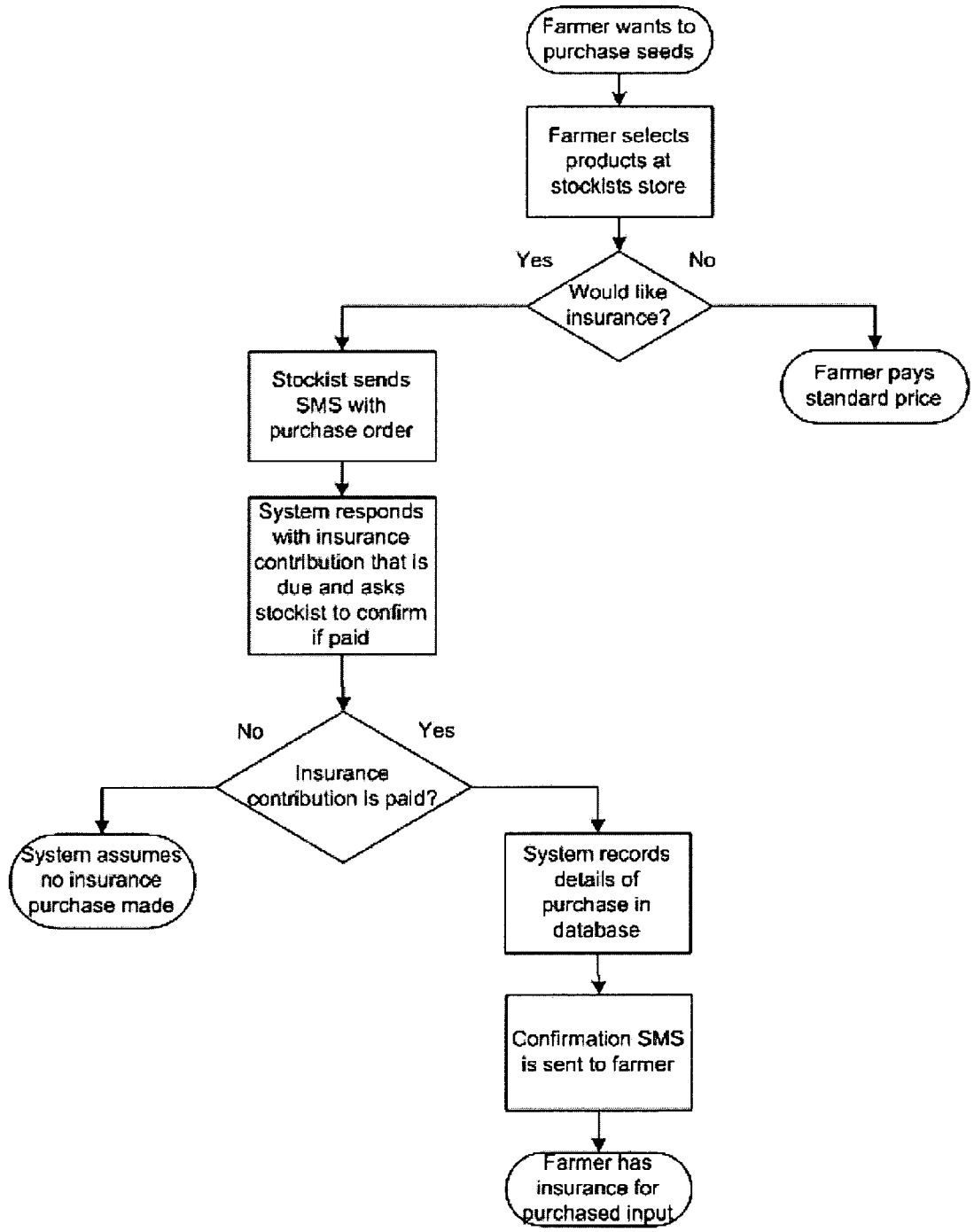
FIG. 5 shows the workflow diagram related to this purchase process of FIG. 4.

This purchase process uses SMS, the M-Pesa MMTS application and an API as software and communication technologies. The workflow related to this purchase process is shown in FIG. 5.

Figure 6:
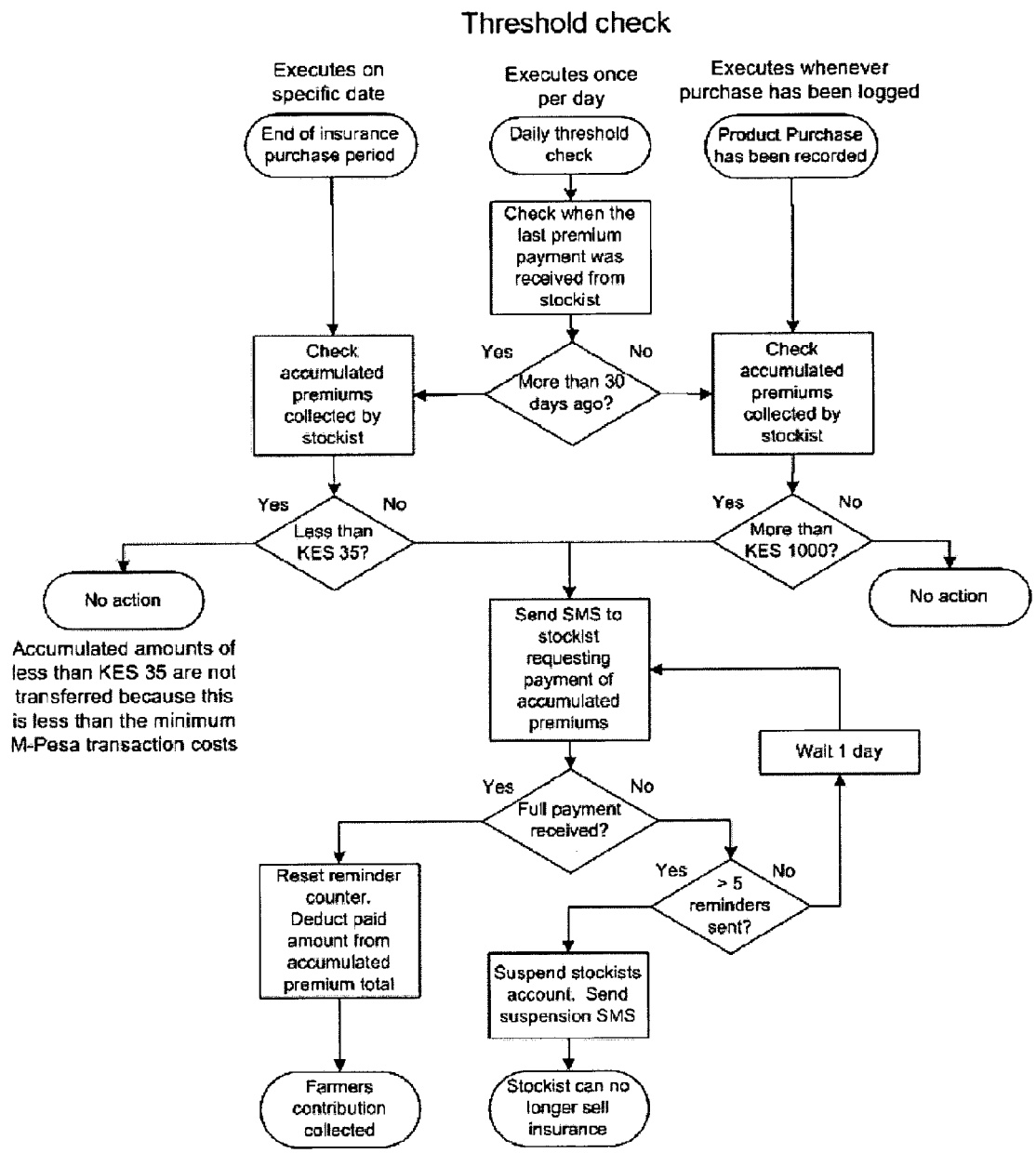
FIG. 6 shows a diagram with the workflow of the collection of premiums from stockists of a preferred embodiment of the method and a preferred embodiment of the business method according to the invention.

The workflow of the collection of premiums from stockists is shown in the diagram of FIG. 6. Whenever a purchase is made that includes insurance, the Stockist 4b collects the 5% premium. These collections are accumulated until either of the following two situations occur:

1. The accumulated premiums are larger than a minimum of 1000 KES.
2. More than 30 days have passed since the last transfer and the accumulated premiums are larger than 35 KES.

In either case an SMS is sent to Stockist 4b asking him to pay the accumulated premiums to the insurance company. Stockist 4b then performs the transfer using the M-Pesa MMTS. If for any reason Stockist 4b fails to make the transfer, a number of warning SMS are sent to him and failure to pay after numerous warnings results in Stockist's 4b account being suspended. While being suspended, Stockist 4b cannot accept PAYGO insurance payments as the system will not process the transaction until the previously accumulated premiums have been paid. Further reference is made to the diagram in FIG. 10, showing a preferred method of PAYGO purchase.

The collection of premiums from suppliers preferably works as follows: At the end of the insurance purchase period, each of the participating suppliers is informed of the total purchases made with insurance on their products. Each supplier is then required to pay the corresponding premium amount to the insurance company via bank transfer. Thus the farmer pays 5% and the participating suppliers pays 5% in order to cover the full insurance premium of 10%.

Compensation payout for PAYGO is explained with reference to the diagram in FIG. 7. It is preferred that either, the insurance company pays out the compensation completely in the form of money, e.g. via M-Pesa, or alternatively, that the compensation is paid out completely in the form of the physical product, e.g. seeds, preferably by the stockist. However, compensation can be also paid out as a combination of both. In this case, the insurance premium is paid in part by the farmer and in part by the participating suppliers, the compensation payout is also split between farmers and suppliers. The suppliers are then able to offer their part of the compensation back to the farmers as inputs. Splitting the compensation into cash and inputs in this manner helps to promote that the farmers will purchase from the same supplier again. This buy-in provides a reason for the suppliers to participate in the program and contribute 5% to the premiums. It also helps to motivate the stockists to promote the insurance, as they also benefit from the additional sales during a payout.

Figure 7:
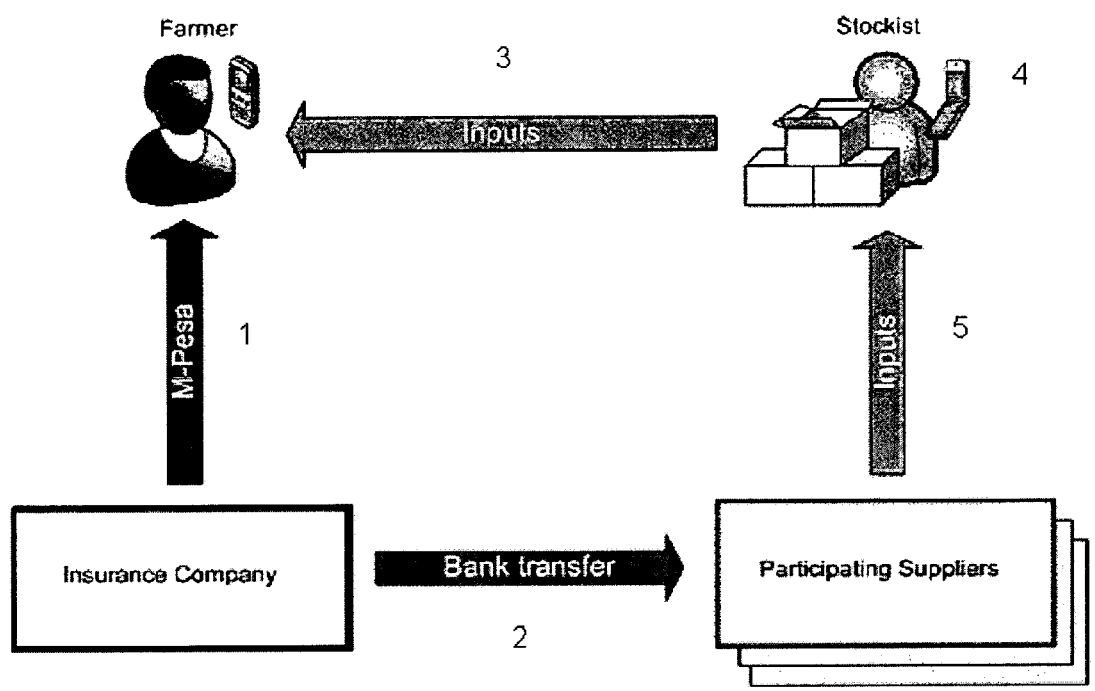
FIG. 7 shows a diagram with steps of the compensation payout for the PAYGO model of a preferred embodiment of the method and a preferred embodiment of the business method according to the invention.

In FIG. 7, the insurance company pays part of the compensation payout directly to the farmer, via M-Pesa (step 1). The remaining part of the compensation is paid by the insurance companies to the supplier(s) that contributed to the insurance premium, via bank transfer (2). The farmer collects free inputs (agricultural products) from the stockists corresponding to his entitled inputs compensation amount (3). Details of each compensation payout via inputs are recorded using the system and method according to the invention (4), in particular by using the RRCD or RDPU, respectively, to acquire the information. The suppliers are informed of the inputs reimbursement that needs to go to each stockists. This amount is offset against future orders from the stockist (5).

The compensation payout is now described in more detail:

In the event of a compensation payout the insurance company or the supplier company will send out an SMS to all affected farmers by means of the CDPU 3, in particular automatically to multiple farmers, in particular to User 2b, for example with the following text:

"Due to weather conditions in your area, you are entitled to a compensation of 1280 KES worth of the supplier's products and 1890 KES worth of fertilizer products. To claim your compensation please go to your defined stockist and present your insurance registration card."

User 2b then presents his insurance receipt to Stockist 4b who then scans the QR code on the receipt. The Software 10 will send a request to the CDPU 3 to verify the claim number and find out how much remaining compensation the farmer is entitled to. When the compensation amount is known, the farmer informs Stockist 4b of how much of that compensation he would like to spend at that time. Stockist 4b enters this amount into the Software 10 which communicates this back to the CDPU 3. The CDPU 3 then sends an SMS to the User 2b asking him to confirm the action, e.g. with the following text:

"Confirmation request: Please confirm that you wish to claim 500 KES worth of supplier's products now from your stockist by replying to this SMS with the word 'Yes'!".

User 2b replies to the SMS to confirm the compensation collection. The UDPU 3 sends a confirmation to Stockist 4b, deducts the compensation amount from User's 2b account, and credits Stockist's 4b account on the CDPU 3 with the compensation amount. Later the supplier company pays Stockist 4b in cash (via the M-Pesa MMTS) or via inventory to reimburse Stockist 4b for any compensations that have been paid out by him.

CDPU 3, acting as a server, preferably performs the following functions, respectively preferred:

hosts the database containing stockist and farmer details provides a web form for registering new stockists provides a web interface to provide access to the stockist, farmer, policy and claim data (for reading, writing and editing this data)

hosts the latest version of the mobile client application and data tables; the mobile clients can download the application and/or tables from the server whenever required receives SMS from farmers via a long or short code automatically responds to recognized SMS requests from farmers, e.g. in order to return insurance policies, status or compensation entitlements allows a user to send bulk SMS to selected farmers based on their regions, insurance types or mobile phone numbers.

Detects when packages from clients are missing (based on package number from client) and requests a resend performs a threshold check on all stockists accounts on a daily basis and sends an E-mail message to a stockist when it is time for him to transfer money provides E-mail alerts to events such as ASSIST requests (requests for help on certain system functions)

logs all incoming and outgoing SMS messages provides real-time statistics on the number of SMS, farmers, policies, etc., and/or backs up the database on a daily basis.

As an alternative option for performing the purchase of an insured product, and as an alternative embodiment of the invention, it is provided to let a farmer purchase an insurance card at the beginning of a season in order to have all of his/her investments covered by insurance.

Using an insurance card purchase, insurance is purchased upfront with the use of an Insurance Card that secures the farmers investments. The insurance costs approximately 10% of the insured amount and can be purchased independently of input products or services. Insurance cards (also referred to as being embodiments of the "data storage medium" according to the invention) are freely distributed amongst stockists. The cards define the insurance type, the region covered and the amount of the covered policy. The cards themselves have no value until they are 'Registered' by the farmer. Reference is made to FIG. 11, which shows two examples of an insurance card.

The "Value Insured" represents the total coverage of the insurance and constitutes the maximum compensation in the case of full payout. The "Crop" designates the type of crop that is covered by the insurance. Different crops can be covered using different insurance cards. To make the insurance more affordable farmers are given discounts on products up to the Total Discount amount which represents 5% of the sum insured (approx half the amount of the insurance premium). Farmers are only entitled to the discounts when they have purchased insurance. Whenever a farmer makes a purchase that includes a discount, the discount amount is deducted from the farmers account until the discount entitlement reaches zero. At that point the farmer is asked to purchase additional insurance in order to cover the full investments and obtain further discount entitlements.

The "Policy Number" is unique to each card. This number is used when a farmer first registers for insurance. The format of the number is as follows: YY C 12345, where YY—Year or season, C—Crop/insurance type, 12345—Unique serialized number.

There are different denominations of insurance cards and farmers can purchase multiple cards to obtain additional coverage. To purchase insurance a farmer goes to a stockist, selects the desired insurance card, and then performs the registration and payment via his mobile phone. Payment for the policy is performed using M-Pesa. At the time of registration a farmer must also provide a "Region code" which is a 2 digit number identifying the closest weather station. The insurance is based on the rain recorded at this station. A list of Region Codes is displayed by the stockist (FIG. 12a). Insurance can be obtained for certain events and certain times of the year (seasons). The corresponding information is available to the stockist in the form of a table, shown in FIG. 12b.

To purchase insurance the farmer begins the process by making an M-Pesa payment. He enters the policy number from the insurance card, together with the region code, in the field for the 'account number' as defined by M-Pesa. He then enters the amount and makes the transfer to the insurance companies account. When the payment is received the M-Pesa system informs the supplier's system of the payment. The supplier's system then registers the farmer's details in the database and requests the national ID number via SMS.

The diagram in FIG. 13 shows the relationship between the entities involved in an insurance card purchase, as another preferred embodiment of the invention. The farmer (e.g. User 2b) collects the insurance card at an input dealer (e.g. Retailer 4b) (step 1). and pays for it via M-Pesa, which sends a confirmation on the payment related to a purchase identification code to the UCD 2 of the User 2b and to the server (CDPU 3), which registers the payment (step 2). The input dealer registers the purchase by means of his RRCD 4a or RDPU 4, respectively, which communicates the product data, user ID code, and the policy identification number, which uniquely identifies the user's contract of an insured value (represented by the insurance card) by means of the software 10 via a SMS or USSD based data connection (3). The hosted server with insurance database (CDPU 3) sends a confirmation with details on the insured product, premium, and remaining value of the totally insured sum, represented by the insurance card, to the farmer via SMS or USSD (4). As in the PAYGO purchase model, the data of the server can be accessed via the Internet by different parties, involved in the insurance contract (5).

The diagram in FIG. 14 shows the money flow during insuring card purchase, in particular the flow of money that is involved in the purchase of insurance premiums using the insurance card model. In step 1, an insurance card is purchased by the farmer, who pays the total premium, e.g. 10% of the value of the product, upfront to the insurance company. The farmer receives a discount, e.g. 4%, on the purchased agricultural products due to his insurance card (2). The suppliers reimburse the stockists for the discounts given to the farmers (3). Thus the farmer effectively ends up paying 6%, the suppliers pay 5%, and 1% is retained by the stockist for participating in the program. The stockists therefore will likely also benefit from repeat sales from farmers after a drought although this is not guaranteed as the farmer is paid directly via M-Pesa and may choose to spend the compensation as they see fit. However, the stockist receives at least the 1%.

Another option according to another embodiment of the invention is to purchase the insurance as part of a bank loan. An alternative to farmers purchasing insurance cards is to have the insurance included as part of a bank loan. In this scenario the bank on behalf of the farmer pays the premium as part of the loan. The bank 'Registers' the farmers that have taken out a loan and later pays the corresponding premiums to the insurance company. If there is a compensation payout the money goes directly to the bank deducted from the original loan. This is part of the terms and conditions and is accepted by the farmer when taking out a loan that includes weather insurance. The insurance helps to secure the loan for the farmer as it reduces the banks risk.

When a bank registers insurance for a farmer the following information is required
1. Banks ID: 123 (3)
2. Farmers mobile number: 123 456 7890 (10)
3. Region code: 12 (2)
4. Policy number: 12345678 (8)
5. National ID number: 12345678 (8)

The bank sends the first 4 elements and the 5th element (National ID) is obtained later from the farmer directly.

The bank sends the following information via SMS for every policy that is sold as part of a loan.

{Banks ID} {Farmers mobile number} {Region code} {Policy number}
Eg. 123 1234567890 12 12345678
Example SMS: 233 0796000499 21 09154217

No keyword is used but it is important that the first 3 characters are separated by a space, and represent a valid bank ID. The diagram of FIG. 15 describes how insurance is registered when it is part of a bank loan. The bank registers a farmer (e.g. User 2b) by sending registration data, e.g. by an SMS with the content "233 0796000499 21 09154217" (step 1). Insurance policy is registered in the database (2) of the supplier's server (e.g. CDPU 3). The server confirms by SMS to the bank "Registration confirmed! 0796000499 is now insured for 1000 KES of Maize insurance" (3) and to the farmer "You have been issued with Maize weather insurance for the Nanyuki region from Bank X. To complete the registration please reply with your National ID number." (4). The User 2b answers by SMS to the server with his national ID code "12039131" to complete the registration (5). The national ID number is recorded in database (6). At the end of the purchase of the insurance for a total amount of value, the bank sends by SMS a confirmation ID code providing for example the content "Congratulations you now have 1000 KES worth of Maize insurance for the Nanyuki region!" (7).

FIG. 16 shows the diagram of the workflow, which is used when a bank offers insurance as part of a loan, as an alternative embodiment of the invention to purchase an insured product.

At the end of the registration period the banks transfer the total amount of premium's to the insurance companies account. This is performed automatically by detecting the end of an insurance registration period, calculating premiums owing from each bank, let the insurance companies issue invoices to banks for premiums, let the bank transfer money to the account of the respective insurance company, and ending up in the status, that the bak collected premiums are all paid.

Once a farmer has successfully registered and paid for the insurance policy, either by themselves or via a bank loan, the farmer is then entitled to product discounts. Each bank and stockist will have an identifying code that is entered whenever they send an SMS. The code is used to link insurance registrations and discounts back to the bank/stockist. The codes may be set up as follows:

Bank: 123—3 digit number to identify a bank. The first digit is used for the bank and the last two digits identify the branch.

Stockist: 1234—4 digit number to identify a stockist.

This approach allows multiple mobile phones to be used by each bank or stockists without requiring that every mobile number be registered with the server.

The invention, in particular the business method, provides that discounts on participating products are offered at a fixed amount per kilo/liter. This is to avoid fluctuations due to price differences amongst stores. Using a chart as shown in FIG. 17, a farmer can see how much discount in KES he will receive per kilo of seeds regardless of the store price for those seeds.

When a farmer purchases a product that is supported by an insurance discount, the following process is used, which is explained with reference to FIG. 18:

a) A farmer (e.g. the User 2b) selects a product and from a chart on the wall he/she can see how much discount is offered.
b) When making the purchase he informs the stockist that he has previously purchased weather insurance.
c) The stockist sends an SMS, e.g. "9655 0796000499 21 2" with the farmers mobile number, the item ID and the number of kilograms purchased (step 1) by means of the RRCD 4a and RDPU 4, respectively, using the software 10.
d) The system (supplier's server or CDPU 3, respectively) looks up the remaining discount entitlement that is available for the farmer (2) and responds with the total discount (in KES) available for that purchase. If no discount is possible, or if only a partial discount is available, the farmer is advised to purchase additional insurance. The server answers by SMS to the stockist "0796000499 is entitled to the full discount of KES 18 on 2 kilos of Maize seeds. Does the farmer wish to use the discount? Reply with the word 'YES' if the purchase is made."
e) The stockist confirms the purchase with sending "Yes" by SMS when payment has been received with an acknowledge SMS. The system then subtracts the corresponding discount from the farmer's entitlement and credits the stockists account (in the Syngenta database) with the discount amount given (5).

At the end, the server confirms to the UCD 2 of the User 2b with an SMS with the content "You have received a discount of KES 18 on your purchase of 2 kilos of Maize seeds. The Total Discount remaining is 0.", for example. In the event that the remaining discount entitlement is not sufficient to fully cover the purchase amount, the following alternative messages could be displayed at step (3):

"0796000499 is entitled to a partial discount of 15 KES on 2 kilos of Maize seeds. In order to receive the full discount the farmer would need to purchase additional insurance. Does the farmer wish to use the PARTIAL discount? Reply with the word 'YES' if the purchase is made."

"0796000499 does not have an insurance coverage and is not entitled to a discount."

"0796000499 has no discount entitlements remaining. In order to receive a discount the farmer needs to purchase additional insurance."

FIG. 19 shows a diagram of the product purchase with discount workflow.

If the stockist charges the discount price to the farmer then the supplier company needs to reimburse the stockist plus compensate for the SMS costs that have been accumulated. Reimbursement could be performed in cash (via M-Pesa or bank transfer) or via future inventory purchases.

The system is not only used for tracking insurance registrations and discount payments, but it can also be used as a marketing platform by sending SMS messages to registered farmers. Participating suppliers and selected organization's (E.g. Extension information providers or healthcare related) will be able to utilize the marketing services. Participating suppliers that offer discounts will automatically receive the right to send 3 SMS messages to registered farmers during the course of the season. Other selected organizations will be able to pay to utilize the marketing channel. Approved companies will be able to send SMS's to farmers using a special web site. The web application will provide statistics on the farmers, regions and crops being grown and allow the user to format and send an SMS to selected farmers. At no time will the actual mobile numbers of the farmers be revealed to the companies/organizations utilizing the marketing platform.

The system, the method and the business method of the invention are described to provide—or to use—an RMD for the measurement of weather data and to enable the purchase of a weather insurance and an insured agricultural product. However, the invention can also be used to remotely detect other data than weather data by an adequately configured RMD and/or to enable the purchase of other products and services than agricultural products or weather insurance. This can be achieved in particular by providing a system for providing a site-related service for a product to be sold to at least one individual user, comprising at least one central data processing unit (CDPU), at least one remote measurement device (RMD) for the measurement of site-dependent parameters, at least one remote data processing unit (RDPU) of a retailer, the at least one RMD being adapted to measure and provide the site-dependent parameters as remotely measured data, each RMD having an individual RMD identification (ID) code assigned to it, each RMD being adapted to communicate the remotely measured data to a CDPU, the at least one RDPU being adapted to generate a data set (RDPU data) comprising at least product data, an RMD ID code and a user ID code, the product data containing in particular an insurance ID code, the at least one RDPU being further adapted to communicate the RDPU data to a CDPU, the at least one CDPU being adapted to receive the RDPU data and to generate thereof an individual contract confirmation code, the CDPU being further adapted to communicate said individual contract confirmation code to at least one remote communication device (UCD) of an individual user, and by providing a corresponding method and business method, which use such a system.

The invention claimed is:

1. System for providing a site-related weather insurance contract for a product to be sold to at least one individual user, in particular of an agricultural product like seeds or fertilizer, comprising:
at least one central data processing unit (CDPU),
at least one remote measurement device (RMD) for the measurement of site-dependent weather parameters,
at least one remote data processing unit (RDPU) of a retailer, the at least one RMD being adapted to measure and provide the site-dependent weather parameters as remotely measured data, each RMD having an individual RMD identification (ID) code assigned to it, each RMD being adapted to communicate the remotely measured data to a CDPU, the at least one RDPU being adapted to generate a data set (RDPU data) comprising at least product data, an RMD ID code and a user ID code, the product data containing in particular an insurance ID code, the at least one RDPU being further adapted to communicate the RDPU data to a CDPU, the at least one CDPU being adapted to receive the RDPU data and to generate thereof an individual contract confirmation code, the CDPU being further adapted to communicate said individual contract confirmation code to at least one remote communication device (UCD) of an individual user.

2. System according to claim 1, wherein an RMD and/or an RDPU is adapted to automatically and/or semi-automatically and/or manually communicate data, in particular the measured parameters or the RDPU data, respectively, in particular upon request of the CDPU, via a telecommunication network.

3. System according to claim 1, wherein a CDPU is adapted to receive the remotely measured data from a specific RMD and to evaluate the data.

4. System according to claim 1, wherein a RMD and/or a CDPU is adapted to evaluate the remotely measured data from a specific RMD for assessing whether they prove an event insured having occurred at the site of the specific RMD, and to generate and provide the result as event data which preferably also comprises the corresponding RMD ID code.

5. System according to claim 4, wherein the CDPU is adapted to communicate said event data, which indicates, in dependence on the event data, that a compensation is due for a specific product and a specific user.

6. System according to claim 1, wherein multiple RMDs are distributed to different geographical sites, the RMDs preferably being mounted in a stationary way.

7. System according to claim 1, wherein the RDPU is adapted to import a product ID code, an insurance type ID code, an RMD ID code and/or a user ID code, in particular by providing import means which can comprise one of a camera, a bar code scanner (1D, 2D or different), an RFID scanner, a keyboard, or a fingerprint reader.

8. System according to claim 1, wherein the system further comprises at least one retailer remote communication device (RRCD), which provides the RDPU.

9. System according to claim 8, wherein the RRCD is a mobile phone device, preferably a managed mobile phone device.

10. Method for providing a site-related weather insurance contract for a product to be sold to individual users, in particular of an agricultural product like seeds or fertilizer, using in particular the system according to claim 1, the method comprising the steps:

providing at least one remote measurement device (RMD) for measuring the site-dependent weather parameters at a first remote site, each RMD having an individual RMD identification (ID) code assigned to it, each RMD being adapted to communicate the measured parameters to a CDPU, registering a user with a second remote site (retailer) by generating a user ID code, selecting an RMD and a corresponding RMD ID code in dependence on a third remote site, where the user will apply the product (product application site), selecting a product to be sold and to be insured, preferably selecting an insurance type which has a corresponding insurance ID code, generating a data set (RDPU data) comprising at least the product data, the RMD ID code and the user ID code, the product data in particular containing said insurance ID code, communicating the RDPU data to a central data processing unit (CDPU) by means of a remote data processing unit (RDPU), having the CDPU generate an individual contract confirmation code from the RDPU data, preferably in dependence on a payment status for an individual user, having the CDPU communicate said individual contract confirmation code to a remote communication device (UCD) of the user.

11. Method according to claim 10, further comprising the step:

measuring by means of at least one RMD the site-dependent weather parameters, each RMD having an individual RMD identification (ID) code assigned to it, and each RMD being adapted to communicate the measured parameters to a CDPU.

12. Method according to claim 11, further comprising the steps:

evaluating the remotely measured data from a specific RMD and assessing whether they prove an event insured having occurred at the remote site of the specific RMD, and, if so, providing the result by means of the CPDU as event data indicating that a compensation is due for those contracts which are related to the specific RMD, the event data preferably comprising the corresponding RMD ID code.

13. Method according to claim 12, further comprising the step:

communicating said event data to an UCD, which indicates, in dependence on the event data, that a compensation is due for a specific product insured and a specific user.

14. Method according to claim 12, further comprising the steps:

comparing the RMD ID code of the specific RMD for which a compensation is due, with multiple, in particular all, RDPU data with a related confirmed and active contract, determining, in dependence on the result of said comparison, for which user or users a compensation is due, and, if the number of such determined user is not zero, paying a compensation to the determined user or users.

15. Retailer remote communication device (RRCD) for being used in the system according to claim 9, which preferably is a managed mobile phone device, i.e. whose communication capability is limited to the communication with a CDPU.

16. RRCD according to claim 15 which comprises said remote data processing unit (RDPU).

17. RRCD according to claim 15 which comprises import means which in turn can comprise a camera, a bar code scanner (1D, 2D or different), an RFID scanner, a keyboard, a fingerprint reader or the like for importing a product ID code, an insurance type ID code, an RMD ID code and/or a user ID code.

18. RRCD according to claim 15 wherein the RDPU is configured to perform functions controlled by a computer program, for example, importing data by means of an import device.

19. Computer software for the control of functions related to the system according to claim 1, in particular
for importing data by means of an import device or
for transferring said first data set to said CDPU.

20. Computer software according to claim 19 which is adapted to be run on an RDPU.

21. Data storage medium (e.g. an insurance card) for storing and preferably visually indicating data which are acquired by the system according to claim 1.

22. Packaging for a product to be insured by the system according to claim 1 wherein data storage means are provided and wherein preferably said product data and/or an insurance ID code and/or said RMD ID code and/or said user ID code are stored.

23. Packaging according to claim 22 comprising means for indicating information which preferably permanently indicates said information, in particular upon external triggering, in particular visually, said information being one of the vendor's company sign or name, the insurance company's sign or name, the product name, the user name, or the name of the first remote site (RMD).

* * * * *